(12) United States Patent
Fay

(10) Patent No.: US 11,743,309 B2
(45) Date of Patent: *Aug. 29, 2023

(54) METHOD AND APPARATUS FOR RECEIVING DIGITAL TELEVISION TRANSMISSION FRAMES

(71) Applicant: Saturn Licensing LLC, New York, NY (US)

(72) Inventor: Luke Fay, San Diego, CA (US)

(73) Assignee: Saturn Licensing LLC, New York, NY (US)

( * ) Notice: Subject to any disclaimer, the term of this patent is extended or adjusted under 35 U.S.C. 154(b) by 133 days.

This patent is subject to a terminal disclaimer.

(21) Appl. No.: 17/214,355

(22) Filed: Mar. 26, 2021

(65) Prior Publication Data

US 2021/0234910 A1    Jul. 29, 2021

Related U.S. Application Data

(63) Continuation of application No. 16/576,372, filed on Sep. 19, 2019, now Pat. No. 11,032,338, which is a
(Continued)

(51) Int. Cl.
*H04J 3/06*    (2006.01)
*H04L 65/61*   (2022.01)
(Continued)

(52) U.S. Cl.
CPC ............ *H04L 65/611* (2022.05); *H04J 3/067* (2013.01); *H04L 65/70* (2022.05);
(Continued)

(58) Field of Classification Search
CPC ..... H04L 65/4076; H04J 3/067; H04N 21/242
See application file for complete search history.

(56) References Cited

U.S. PATENT DOCUMENTS 6,459,687 B1   10/2002   Bourlas
6,804,655 B2   10/2004   Dokic et al.
(Continued)

FOREIGN PATENT DOCUMENTS

| EP | 1 439 700 A1 | 7/2004 |
| JP | 4991692 B2 | 8/2012 |
| WO | WO 2014/168537 A1 | 10/2014 |

OTHER PUBLICATIONS

Extended European Search Report dated Febr. 21, 2019 in corresponding European Patent Application No. 168039980, 9 pages.
(Continued)

*Primary Examiner* — Hoon J Chung
(74) *Attorney, Agent, or Firm* — Jeffery J Brosemer

(57) ABSTRACT

A method of a reception apparatus for receiving transmission frames. The method includes receiving, by circuitry of the reception apparatus, the transmission frames transmitted on one millisecond boundaries. Each of the transmission frames includes a bootstrap, a preamble, and a payload. The method further includes determining, by the circuitry, an absolute point of time at a predetermined position in a stream of the transmission frames based on first time information included in a first one of the transmission frames.

21 Claims, 38 Drawing Sheets

Related U.S. Application Data continuation of application No. 15/077,601, filed on Mar. 22, 2016, now Pat. No. 10,432,680.

(60) Provisional application No. 62/170,089, filed on Jun. 2, 2015.

(51) Int. Cl.
| | |
|---|---|
| *H04L 65/611* | (2022.01) |
| *H04N 21/236* | (2011.01) |
| *H04N 21/2362* | (2011.01) |
| *H04N 21/2383* | (2011.01) |
| *H04N 21/242* | (2011.01) |
| *H04N 21/438* | (2011.01) |
| *H04N 21/462* | (2011.01) |
| *H04N 21/643* | (2011.01) |
| *H04L 65/70* | (2022.01) |

(52) U.S. Cl.
CPC ..... *H04N 21/2362* (2013.01); *H04N 21/2383* (2013.01); *H04N 21/23614* (2013.01); *H04N 21/242* (2013.01); *H04N 21/4382* (2013.01); *H04N 21/4622* (2013.01); *H04N 21/64322* (2013.01); *H04J 3/0667* (2013.01)

(56) References Cited

U.S. PATENT DOCUMENTS

| | | | |
|---|---|---|---|
| 10,432,680 | B2 | 10/2019 | Fay |
| 11,032,338 | B2* | 6/2021 | Fay .................... H04N 21/2362 |
| 2007/0030821 | A1 | 2/2007 | Iwamura |
| 2007/0165578 | A1 | 7/2007 | Yee et al. |
| 2009/0080405 | A1 | 3/2009 | Lee |
| 2013/0121229 | A1 | 5/2013 | Väre et al. |
| 2013/0219431 | A1 | 8/2013 | Hong et al. |
| 2014/0044108 | A1 | 2/2014 | Earnshaw et al. |
| 2015/0085735 | A1 | 3/2015 | Shelby et al. |
| 2015/0341054 | A1 | 11/2015 | Myung |
| 2017/0126441 | A1 | 5/2017 | Earnshaw |
| 2017/0164017 | A1 | 6/2017 | Hwang |
| 2018/0048410 | A1 | 2/2018 | Michael |

OTHER PUBLICATIONS

Matthieu Crussiere et al., "A Unified Broadcast Layer for Horizon 2020 Delivery of Multimedia Services", IEEE Transactions on Broadcasting, vol. 60. No. 2, XP11549831, Jun. 1, 2014, pp. 193-207.

International Search Report and Written Opinion with Search History dated Sep. 2, 2016 in PCT/US16/33779.

* cited by examiner

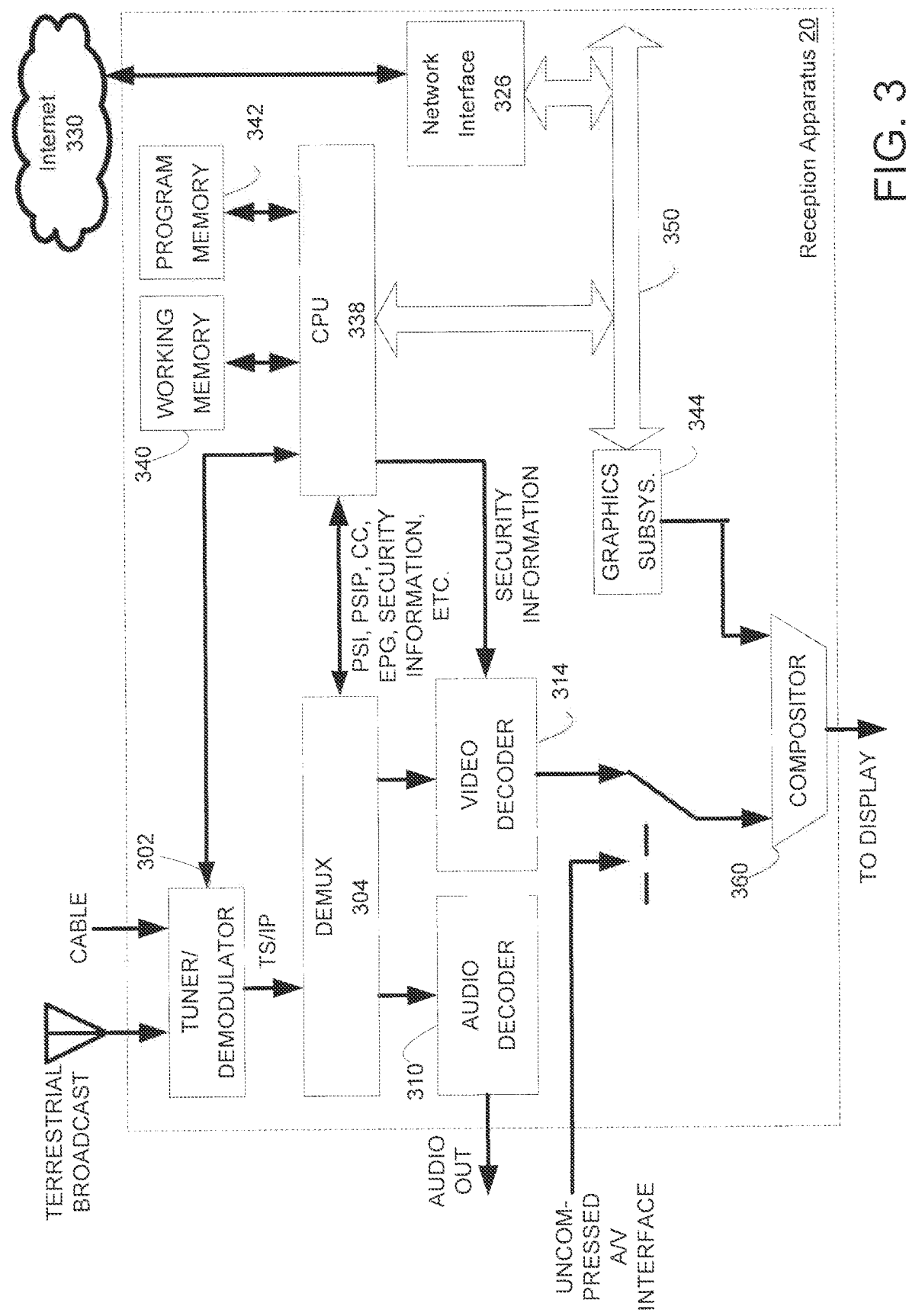

| Packet Type Value | Meaning |
|---|---|
| 000 | IPv4 |
| 001 | Compressed IP Packet |
| 010 | MPEG-2 Transport Stream |
| 011 | Reserved |
| 100 | Signaling |
| 101 | Reserved |
| 110 | Reserved |
| 111 | Extension |

FIG. 12

| EXT_TYPE | Description |
|---|---|
| 000 | Stuffing bytes only (size = EXT_LEN) |
| 001 | ORDER INFORMATION |
| ... | |
| 111 | Reserved |

FIG. 17

5.3.3 Timestamp

The Timestamp type represents a positive time with respect to the epoch.

struct Timestamp
{
    UInteger48 secondsField;
    UInteger32 nanosecondsField;
};

The secondsField member is the integer portion of the timestamp in units of seconds.

The nanosecondsField member is the fractional portion of the timestamp in units of nanoseconds.

The nanosecondsField member is always less than $10^9$.

For example:

+2.000000001 seconds is represented by secondsField = 0000 0000 0002$_{16}$ and nanosecondsField = 0000 0001$_{16}$.

---

7.2.2 Epoch

The epoch is the origin of the timescale of a domain.

The PTP epoch is 1 January 1970 00:00:00 TAI, which is 31 December 1969 23:59:51.999918 UTC.

NOTE 1—The PTP epoch coincides with the epoch of the common Portable Operating System Interface (POSIX) algorithms for converting elapsed seconds since the epoch to the ISO 8601:2004 printed representation of time of day; see ISO/IEC 9945:2003 [B16] and ISO 8601:2004 [B17].

FIG. 30

| Mode | INTERMEDIATE FORMAT (COMPRESSED PTP) | Epoch |
|---|---|---|
| 0 | 48 bit + 32 bit | STANDARD (01/01/1970) |
| 1 | 32 bit + 19 bit | STANDARD (01/01/1970) |
| 2 | 32 bit + 27 bit | STANDARD (01/01/1970) |
| 3 | Reserved | Reserved |
| 4 | 48 bit + 32 bit | INDEPENDENCE (01/01/2016) |
| 5 | 31 bit + 19 bit | INDEPENDENCE (01/01/2016) |
| 6 | 31 bit + 27 bit | INDEPENDENCE (01/01/2016) |
| 7 | Reserved | Reserved |
| ... | ... | ... |
| 15 | Reserved | Reserved |

FIG. 33

| Syntax | No of bits | Semantics |
|---|---|---|
| time_info_flag | 1 | FLAG INDICATING PRESENCE OF TIME INFORMATION |
| if (time_info_flag == 1) { | | |
|   PTP_secondsField | 32 | SECONDS FIELD |
|   PTP_nanosecondsField | 19 | NANOSECONDS FIELD |
| } | | |

FIG. 34

| Syntax | No of bits | Semantics |
|---|---|---|
| time_info_flag | 1 | FLAG INDICATING PRESENCE OF TIME INFORMATION |
| if (time_info_flag == 1) { | | |
| mode | 4 | TIME INFORMATION COMPRESSION MODE |
| if (mode == 0 \|\| mode == 4) { | | |
| PTP_secondsField | 48 | SECONDS FIELD |
| PTP_nanosecondsField | 32 | NANOSECONDS FIELD |
| } else if (mode == 1) { | | |
| PTP_secondsField | 32 | SECONDS FIELD |
| PTP_nanosecondsField | 19 | NANOSECONDS FIELD |
| } else if (mode == 2) { | | |
| PTP_secondsField | 32 | SECONDS FIELD |
| PTP_nanosecondsField | 27 | NANOSECONDS FIELD |
| } else if (mode == 5) { | | |
| PTP_secondsField | 31 | SECONDS FIELD |
| PTP_nanosecondsField | 19 | NANOSECONDS FIELD |
| } else if (mode == 6) { | | |
| PTP_secondsField | 31 | SECONDS FIELD |
| PTP_nanosecondsField | 27 | NANOSECONDS FIELD |
| } | | |
| } | | |

FIG. 35

METHOD AND APPARATUS FOR RECEIVING DIGITAL TELEVISION TRANSMISSION FRAMES

CROSS-REFERENCE TO RELATED APPLICATIONS

This application is a continuation of U.S. application Ser. No. 16/576,372, filed Sep. 19, 2019, which is a continuation of U.S. application Ser. No. 15/077,601, filed Mar. 22, 2016, which is a non-provisional application of U.S. Provisional Application Ser. No. 62/170,089 ("System Time Frequency") filed Jun. 2, 2015, the entire contents of each of which are incorporated herein by reference.

TECHNICAL FIELD

The present disclosure relates to signaling the distance between predetermined points of time in a transmitted waveform, and a transmission apparatus, a transmission method, a reception apparatus, and a reception method in which time information and the like can be efficiently transmitted.

BACKGROUND

During the last decade, terrestrial broadcasting has evolved from analog to digital. Currently, discussions are underway for implementing the next generation terrestrial television broadcasting system. The next generation system is expected to broadcast larger amounts of data and be implemented as a hybrid system in which data is provided via over the air (OTA) and over the top (OTT) delivery paths. A method for establishing a more accurate system time is needed to increase the speed at which data passes from a content provider to a reception apparatus for presentation to a user and/or to facilitate synchronization of data received over the OTA and OTT delivery paths.

For example, in Advanced Television Systems Committee (ATSC) 3.0 which is one of the next generation terrestrial broadcasting specifications, it is determined that UDP/IP, that is, an Internet protocol (IP) packet including an user datagram protocol (UDP) packet is mainly used in data transmission, instead of a transport stream (TS) packet. In broadcasting methods other than ATSC 3.0, use of an IP packet in the future is expected.

When broadcasting is performed by using TS, a program clock reference (PCR) is transmitted as time information for synchronizing a transmission side with a reception side (for example, see "ARIB STD-B44 ver. 2.0", Association of Radio Industries and Businesses, which is incorporated herein by reference in its entirety. However, this method of transport stream is being phased out as integration with the internet becomes prevalent.

SUMMARY

According to one embodiment of the present disclosure, there is provided a method of a reception apparatus for receiving transmission frames. The method includes receiving, by circuitry of the reception apparatus, the transmission frames transmitted on one millisecond boundaries. Each of the transmission frames includes a bootstrap, a preamble, and a payload. The method further includes determining, by the circuitry, an absolute point of time at a predetermined position in a stream of the transmission frames based on first time information included in a first one of the transmission frames.

Further, according to one embodiment of the present disclosure, there is provided a non-transitory computer-readable storage medium storing instructions, which when executed by a computer, cause the computer to perform the method of the reception apparatus for receiving the transmission frames, as described above.

Further, according to one embodiment of the present disclosure, there is provided a reception apparatus. The reception apparatus includes circuitry configured to receive transmission frames transmitted on one millisecond boundaries. Each of the transmission frames includes a bootstrap, a preamble, and a payload. The circuitry is further configured to determine an absolute point of time at a predetermined position in a stream of the transmission frames based on first time information included in a first one of the transmission frames.

Further, according to one embodiment of the present disclosure, there is provided a method of an information providing apparatus for providing a stream of transmission frames. The method includes generating, by circuitry of the information providing apparatus, first time information that indicates an absolute point of time at a predetermined position in the stream of the transmission frames. The transmission frames are generated. The generated time information is included in a first one of the transmission frames. The method further includes transmitting, by the circuitry, the transmission frames on one millisecond boundaries. Each of the plurality of transmission frames includes a bootstrap, a preamble, and a payload.

Further, according to one embodiment of the present disclosure, there is provided a method of a reception apparatus for determining a time frequency of a plurality of transmission frames. The method includes receiving by circuitry of the reception apparatus a first transmission frame. The first transmission frame includes a bootstrap, a preamble, and a payload. The time frequency is determined by the circuitry based on a baseband sample rate coefficient N signaled in the bootstrap and a time length TL of the first transmission frame. The time frequency indicates a distance between the first transmission frame and a second transmission frame.

Further, according to one embodiment of the present disclosure, there is provided a non-transitory computer-readable storage medium storing instructions, which when executed by a computer, cause the computer to perform the method of the reception apparatus for determining the time frequency of the plurality of transmission frames, as described above.

Further, according to one embodiment of the present disclosure, there is provided a reception apparatus. The reception apparatus includes circuitry configured to receive a first transmission frame. The first transmission frame includes a bootstrap, a preamble, and a payload. The circuitry determines the time frequency based on a baseband sample rate coefficient N signaled in the bootstrap and a time length TL of the first transmission frame. The time frequency indicates a distance between the first transmission frame and a second transmission frame.

Further, according to one embodiment of the present disclosure, there is provided a method of an information providing apparatus for providing a plurality of transmission frames. The method includes generating, by circuitry of the information providing apparatus, the plurality of transmission frames based on a frame time length TL, each of the plurality of transmission frames including a bootstrap, a preamble, and a payload. The method further includes transmitting, by the circuitry, the plurality of transmission frames according to a time frequency that is determined based on a baseband sample rate coefficient N signaled in the bootstrap and the at least one time length TL. The time frequency indicates a distance between a first transmission frame of the plurality of transmission frames and a second transmission frame of the plurality of transmission frames.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 3 illustrates an exemplary reception apparatus

FIG. 12 is a diagram illustrating type information of a Generic packet;

FIG. 17 is a diagram illustrating the extension type information (EXT_TYPE) when the order information is included in a BB header of a BB frame;

FIG. 30 is a diagram illustrating information of a point of time defined by a PTP, which can be used as time information;

FIG. 33 is a diagram illustrating an example of a compression mode in which the PTP is compressed;

FIG. 34 is a diagram illustrating a first example of syntax of a time information describer;

FIG. 35 is a diagram illustrating a second example of syntax of a time information describer;

DETAILED DESCRIPTION

Figure 1:
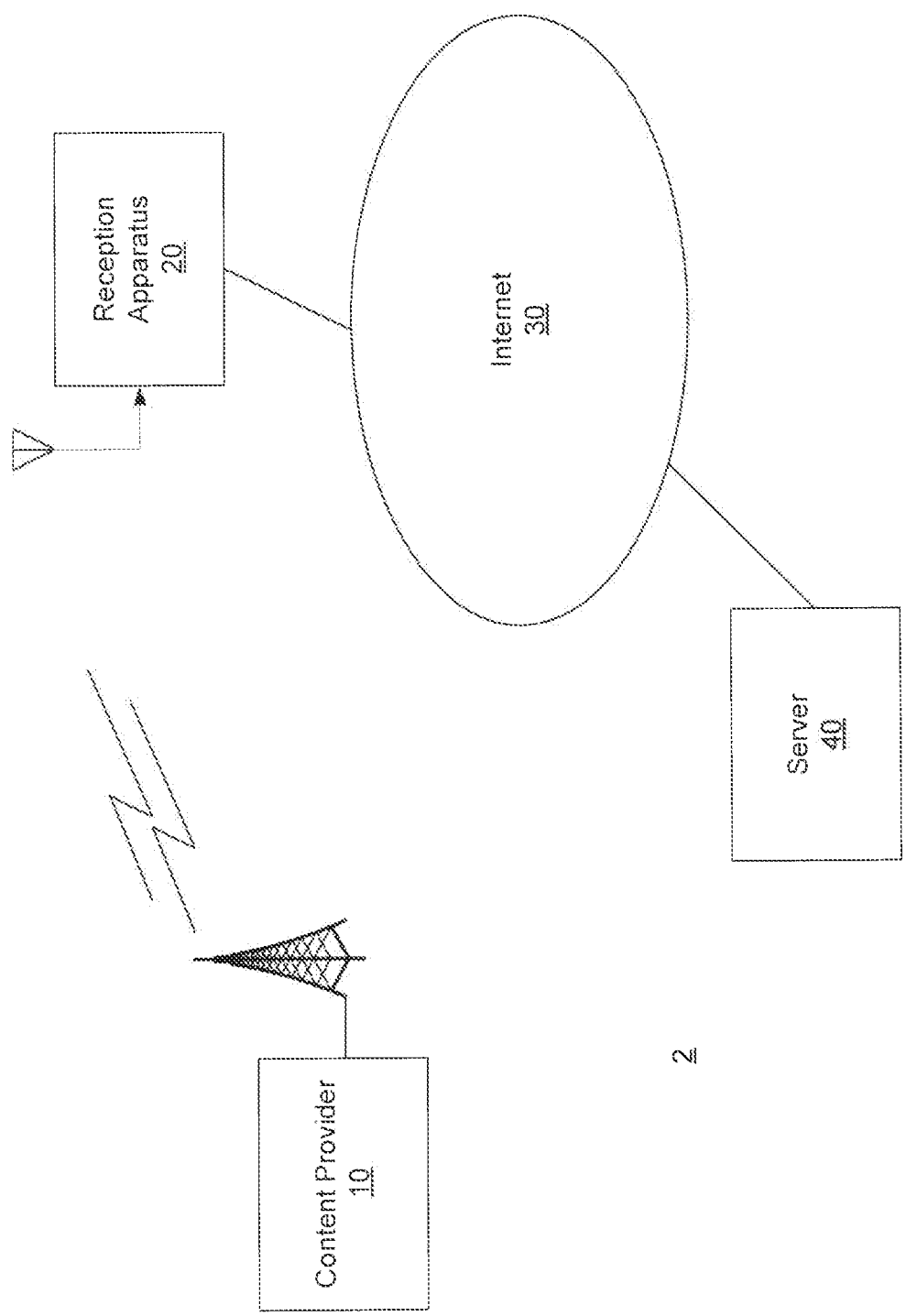
FIG. 1 illustrates an exemplary broadcast system.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Discussions are underway in the Advanced Television Systems Committee (ATSC) to build a broadcast system based on IP packets. Certain embodiments of the present disclosure are related to how the Internet operates in delivering time and the lesson is the more accurate a receiver knows time, the faster data can be passed through that channel. ATSC has organized a group to look at this system time with requirements, including (1) the receiver should be able to determine from the broadcast how much (if any) the receiver's local time interval varies from a (fixed, defined) interval in the broadcast (provide a time reference that is knowable to the receiver such that it can sufficiently reconstruct a time clock with accuracy), (2) how much accuracy/precision in time recovery, and (3) efficiency point of no more bits/sec is allocated than necessary.

Two key things needed for fast operation to occur are (1) time frequency and (2) time phase. Once these are recovered, fast operation can occur. As described in further detail below, a receiver recovers the time frequency and time phase from a transmitted waveform, which in certain embodiments, includes predetermined time points such as "ticks" or "marks." The time frequency indicates the distance between the predetermined time points.

Previous solutions include those directed to the MPEG-2 TS and its header description of time involving a 90 kHz clock. Now with IP, Coordinated Universal Time (UTC) or International Atomic Time (TAI) based time knowledge is key. For example, mobile devices must know when to turn on/off and which time the received packets apply to. Some methods include those that supply a "tick" at the beginning of every preamble and the description of that "tick" in the preamble using a precision time protocol (PTP) like description of a UTC clock. Certain embodiments of the present disclosure describe when the next packet will come, i.e., the frequency of the time "tick". That description of time has some use cases like: Middle layer has chosen Real-time Object delivery over Unidirectional Transport (ROUTE) and MPEG Media Transport (MMT) protocols. Both require time to be known. There is a need to align media delivery to system time with <1 millisecond resolution and <<1 millisecond accuracy to accurately place media relative to emission time. The more accurately time is known, specifically UTC or TAI based time in certain embodiments, the faster data can be pushed through the "pipe" and up the stack for presentation. For example, buffer sizes can be reduced, data from different delivery paths can be matched (assembled) more easily, etc.

ATSC 3.0 hybrid operation requires system time to be known to synchronize data between Over the Air (OTA) and Over the Top (OTT) delivery paths. Broadcast time will be more accurate than Internet time. Accordingly, correct determination of OTA emission time may be essential.

ATSC Candidate Standard A/321 Part 1 (System Discovery and Signaling, Doc. S32-231r4, May 6, 2015), which is incorporated herein by reference in its entirety, uses a bootstrap as a universal entry point to finding a broadcast waveform (or ATSC 3.0 waveform). The bootstrap has a known fixed sampling frequency that signals a preamble sampling frequency. Starting with the equation used to determine the sample rate post-bootstrap, embodiments of the present disclosure derive when the next time "tick" can occur on any 1 millisecond boundary. This level of accuracy is needed due to OFDM symbol lengths being time aligned or symbol parameter aligned. Time frequency will follow every bootstrap, but the description of the "tick" to UTC or TAI based time does not have to be in every bootstrap.

Embodiments of the present disclosure enable a reception apparatus to obtain sampling frequencies to millisecond accuracy rather easily and exploit this attribute of zero sub kilo-Hertz (e.g, 6.912000 MHz or 6.144000 MHz). Although the "tick" is described in certain embodiments as corresponding to the first bit of the preamble, the time "tick" does not have to be a rising edge of the first preamble symbol. For example, the "tick" can be a flag in the bootstrap, a bit usage, or any "mark" of time which occurs in a set time interval.

In certain embodiments, time information is sent in a broadcast over the air system which can be referenced by receivers, including those with Internet connections. This can apply to any system that is trying to recover time of sent packets/transport streams.

Referring now to the drawings, FIG. 1 is a block diagram that shows an exemplary broadcast system 2, including a content provider 10, a reception apparatus 20, and a server 40. The reception apparatus 20 accesses the server 40 via one or more communication networks such as the Internet 30.

Figure 2A:
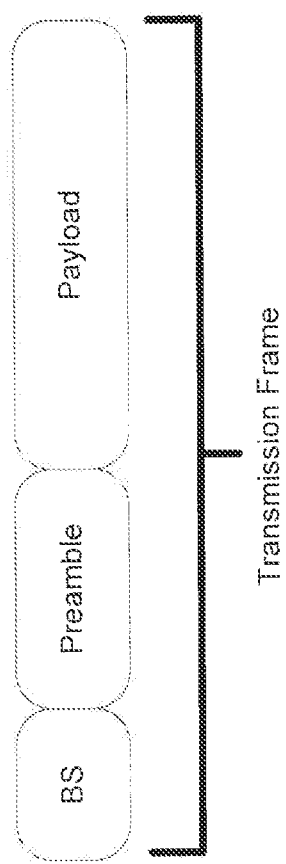
FIG. 2A illustrates an exemplary transmission frame.

The content provider 10, which may be a broadcaster or other service provider, provides content and/or other data to the reception apparatus 20. The content and/or other data are transmitted using a plurality of transmission frames (or ATSC 3.0 frames). An exemplary transmission frame is illustrated in FIG. 2A. As illustrated in FIG. 2A, the transmission frame includes a bootstrap, a preamble, and a payload.

The content provider 10 transmits, or otherwise, provides the content and/or other data to the reception apparatus 20 via a terrestrial broadcast according to one embodiment. In other embodiments, the content provider 10 provides the content via at least one of a satellite broadcast, a cable television transmission, a terrestrial television broadcast, cellular network, and data communication network such as a local area network (LAN), wide area network (WAN), or the Internet 30. The content provider 10 includes a transmission apparatus that performs transmission of the content and/or other data, which form one or more services. The transmission apparatus transmits a stream of target data, such as image data or audio data which form the service such as a program (e.g., television broadcasting program) through a transmission channel. The stream of target data is transmitted as a digital broadcasting signal according to one embodiment.

The transmission apparatus may be implemented to transmit data based on Advanced Television Systems Committee standards (ATSC) or DVB (Digital Video Broadcasting). ISDB (Integrated Services Digital Broadcasting), or in other manners. As the transmission channel, a ground radio wave, a satellite channel, a cable television network (wired communication line) and the like may be employed.

The content provided by the content provider 10 includes one or more television programs, without regard to whether the content is a movie, sporting event, segment of a multi-part series, news broadcast, etc. Further, the content provided by the content provider 10 may also include advertisements, infomercials, and other program-like content which may not be reported as a program in an EPG. The content provider 10 may also provide content that contains only audio or only video.

The reception apparatus 20 receives the content and/or other data transmitted, or otherwise provided, by the content provider 10 and displays the content on a display. The display (e.g., a liquid crystal display, organic light emitting diode display, projector, etc.) may be an integral part of the reception apparatus 20 such as a television set. Alternatively, the display may be external to the reception apparatus 20 such as a television set connected to a set top box. In one embodiment, the reception apparatus 20 receives the digital broadcasting signal which has been transmitted from the transmission apparatus through the transmission channel, and processes the digital broadcasting signal to recover an original stream. Then, the reception apparatus 20 outputs the original stream obtained through the recovery processing. For example, the reception apparatus 20 outputs data of the image or audio as a component forming the service.

The server 40 stores additional content that may or may not be related to the content received from the content provider 10. Although the server 40 is illustrated as a separate component of the system in FIG. 1, it should be noted that the server 40 may be incorporated in the content provider 10 in certain embodiments.

Figure 2B:
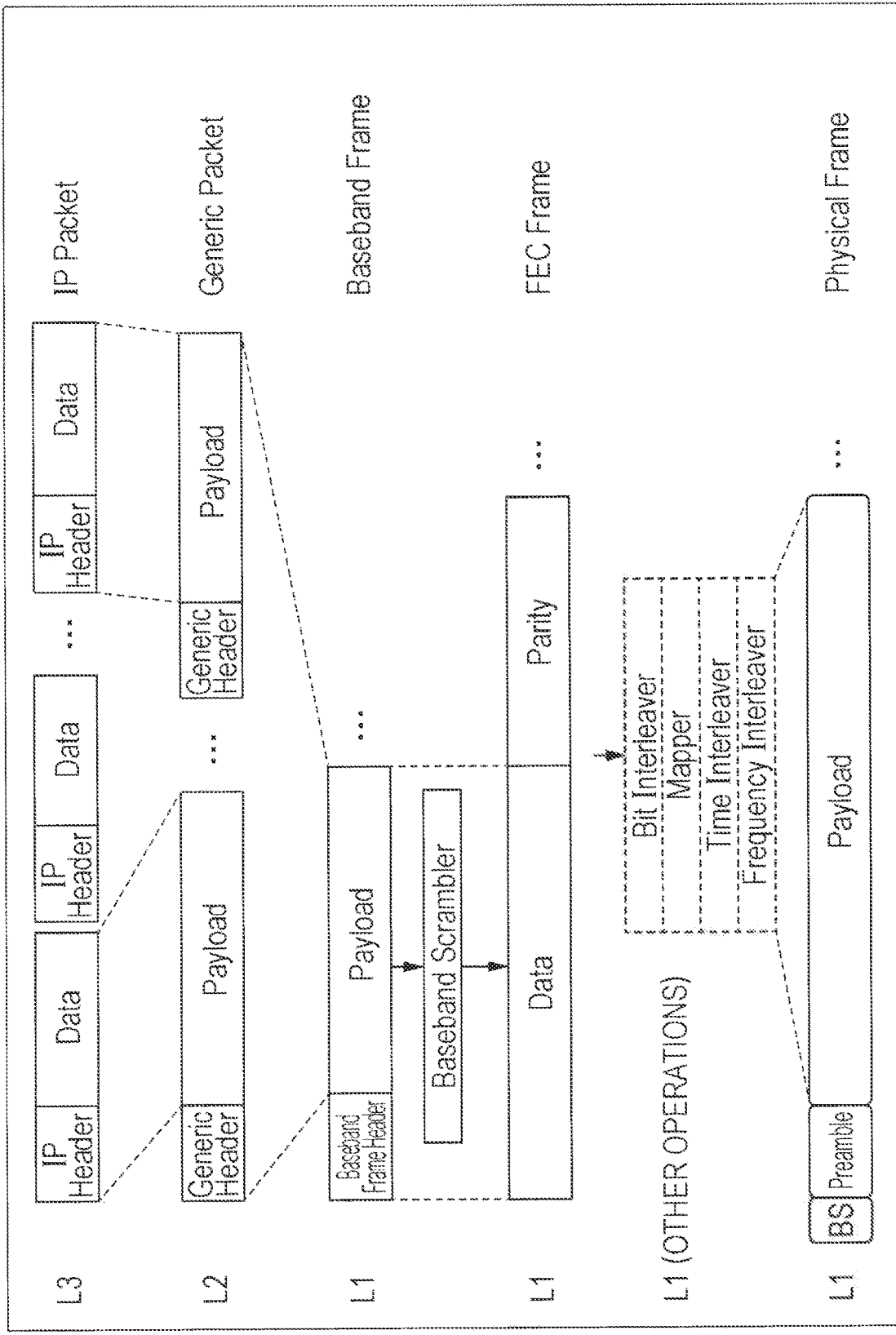
FIG. 2B is a diagram illustrating an exemplary protocol stack used for broadcasting by a transmission apparatus.

FIG. 2B is a diagram illustrating an example of a protocol stack used for broadcasting by the transmission apparatus of the content provider 10, according to one embodiment. FIG. 2B illustrates a data structure of data (e.g., packet and frame) handled in the transmission apparatus. In the transmission apparatus, data of a first layer (physical layer) L1, a second layer (data link layer) L2, and a third layer (network layer) L3 in the Open Systems Interconnection (OSI) reference model is handled.

In FIG. 2B, an IP packet is data of the third layer L3, and a Generic packet is data of the second layer L2. A base band (BB) frame, a FEC frame, and a physical layer frame (physical frame) are data of the first layer L1. In the transmission apparatus in FIG. 1, data broadcasting is performed by using IP packets. The IP packet is formed from an IP header and a data field. Data such as an image and audio is placed in the data field of the IP packet. In the transmission apparatus, the Generic packet is formed (generated) from the IP packet. The Generic packet is formed from a Generic header and payload. One or a plurality of IP packets is placed in the payload of the Generic packet.

In the transmission apparatus, a BB frame is formed from the Generic packet. The BB frame is formed from a BB header (Baseband Frame Header) and payload. One of a plurality of Generic packets is placed in the payload of the BB frame. In the transmission apparatus, BB frames are scrambled in a unit of one or a plurality of BB frames as necessary, and a parity bit for error correction of the physical layer is added to the scrambled BB frame. Thus, a FEC frame is formed.

In the transmission apparatus, processing of the physical layer, such as mapping on a signaling point in bit-interleave or constellation, and interleaving in a time domain or a frequency domain is performed on FEC frames in a unit of one or a plurality of FEC frames as necessary. In the transmission apparatus, a preamble is added to the processed FEC frame which is subjected to processing of the physical layer, and thus a physical layer frame is formed. That is, the physical layer frame is formed from the preamble (BS) and payload. The post processed FEC frame is placed in the payload of the physical layer frame.

In FIG. 2B, the physical layer frame has a "BS (Boot Strap)" and a "Preamble" as the preamble, similarly to an ATSC frame of ATSC 3.0, for example. Here, the "BS" is referred to as a first preamble BS and the "Preamble" is referred to as a second preamble Preamble. The first preamble BS corresponds to a P1 symbol which constitutes a T2 frame of DVB-T.2, for example. The second preamble Preamble corresponds to a P2 symbol which constitutes the T2 frame, for example. The payload of the physical layer frame corresponds to a data symbol constituting the T2 frame, for example.

The physical layer frame structure used in DVB-T2 or ATSC 3.0 is formed to have a signaled length. Regarding the physical layer frame, the payload may be processed after the preamble is processed. That is, the reception apparatus 20 receives the physical layer frame and demodulates a preamble of the received physical layer frame. The reception apparatus 20 performs processing on the payload of the physical layer frame by using the preamble of the physical layer frame, and recovers the FEC frame, the BB frame, the Generic packet, and the IP packet from the physical layer frame in this order. The preamble of the physical layer frame is necessary for processing for the payload of the physical layer frame. For this reason, in the reception apparatus 20, when reception is started in the middle of the physical layer frame, data received during a period of time from when the reception is started until the preamble is obtained is deleted.

As noted above, FIG. 2A illustrates an exemplary transmission frame, such as the physical layer frame described above with respect to FIG. 2B. As described in ATSC Candidate Standard A/321 Part 1, the bootstrap provides a universal entry point into a broadcast waveform (or ATSC waveform). The bootstrap employs a fixed configuration (e.g., sampling rate, signal bandwidth, subcarrier spacing, time-domain structure) known to all receiver devices and carries information to enable processing and decoding the wireless service associated with a detected bootstrap. This new capability ensures that broadcast spectrum can be adapted to carry new services and/or waveforms that are preceded by the universal entry point provided by the bootstrap for public interest to continue to be served in the future.

The bootstrap includes a number of symbols, beginning with a synchronization symbol positioned at the start of each frame period to enable service discovery, coarse synchronization, frequency offset estimation, and initial channel estimation. The remainder of the bootstrap contains sufficient control signaling to permit the reception and decoding of the remainder of the frame to begin. In one embodiment, the bootstrap uses a fixed sampling rate of 6.144 M samples/second and a fixed bandwidth of 4.5 MHz, regardless of the channel bandwidth used for the remainder of the frame. The time length of each sample of the bootstrap is fixed by the sampling rate.

In the broadcasting method such as ATSC 3.0, when time information for synchronizing a transmission side with a reception side is transmitted, efficient transmission of the time information is required. Efficient transmission of information regarded as overhead other than the time information may also be required. Considering such circumstances, the present technology is to enable efficient transmission of time information and the like.

In certain embodiments, time information is carried in the preamble. The preamble is used because the preamble and payload use the same sampling frequency in certain embodiments. For example, the time information is carried in L1 signaling. A reference time corresponds to when a first bit of the preamble is transmitted on air. In one embodiment, the transmission apparatus creates and transmits a physical layer frame having a preamble that includes the time information representing a time of a predetermined location within a stream of a physical layer frame, which includes a preamble and a payload. In another embodiment, the transmission apparatus creates and transmits a physical layer frame having a preamble that includes a time information descriptor. A reception apparatus receives the physical layer frame and performs processing by using the time information included in the time information descriptor. The time information descriptor includes a time information flag representing the existence of the time information that represents the time of a predetermined location within the stream of the physical layer frame having the preamble and the payload. The time information descriptor further includes time information when the time information flag indicates that the time information exists. These technologies, for example, can be used in IP packet broadcasting.

The time information is provided in accordance with the PTP according to one embodiment. PTP is defined in IEEE 1588, which is incorporated herein by reference in its entirety. The time information is used to inform the reception apparatus 20 of UTC or TAI based epochs and may or may not be provided every frame. When the time information is not provided for each frame, the time information may be provided every other frame, every four frames, etc. In one embodiment, the time information is represented by 80 bits, which is divided into 48 bits for the seconds field and 32 bits for the nanoseconds field. The UTC can be calculated by sending an offset from true wall-clock (e.g., 8 bits). In another embodiment, the time information may be provided in accordance with 3GPP TS 36 331, which is incorporated herein by reference in its entirety. In this case, the time information would be represented by 56 bits and would be less accurate than PTP (10 millisecond units). In another embodiment, the time information may be provided using the Network Time Protocol (NTP) or UTC (or TAI based time). The time could be calculated by sending an offset from any epoch.

Embodiments of the present disclosure are described using the UTC or TAI based time as a time reference because UTC or TAI based time does not have leap second problems and is extremely accurate. However, other time references may be used in other embodiments, FIG. 3 illustrates the reception apparatus 20 according to one embodiment. The reception apparatus 20 includes a digital television receiver device that is incorporated into a fixed or mobile device such as a television set, a set top box, smartphone, tablet computer, laptop, portable computer, vehicle entertainment system, or any other device configured to receive television content.

The reception apparatus 20 includes a tuner/demodulator 302, which receives digital television broadcast signals from one or more content sources (e.g., content provider 10) via, for example, a terrestrial broadcast. Depending on the embodiment, the reception apparatus 20 may alternatively or additionally be configured to receive a cable television transmission or a satellite broadcast. The tuner/demodulator 302 receives a signal, including for example IP packets, which may be demultiplexed by the demultiplexer 304 or handled by middleware and separated into audio and video (A/V) streams. The audio is decoded by an audio decoder 310 and the video is decoded by a video decoder 314. Further, uncompressed A/V data may be received via an uncompressed A/V interface (e.g., a HDMI interface), if available.

In one embodiment, the received signal (or stream) includes supplemental data such as one or a combination of closed caption data, a triggered declarative object (TDO), a trigger, a virtual channel table, electronic program guide (EPG) data, non-real-time (NRT) content, etc. Examples of the TDO and trigger are described in ATSC Candidate Standard: Interactive Services Standard (A/105:2014), 513-2-389r7, which is incorporated herein by reference in its entirety. The supplemental data are separated out by the demultiplexer 304. However, the A/V content and/or the supplemental data may be received via the Internet 330 and a network interface 326.

A storage unit may be provided to store non real time content (NRT) or Internet-delivered content such as Internet Protocol Television (IPTV). The stored content can be played by demultiplexing the content stored in the storage unit by the demultiplexer 304 in a manner similar to that of other sources of content. Alternatively, the stored content may be processed and presented to the user by the CPU 338. The storage unit may also store any other supplemental data acquired by the reception apparatus.

The reception apparatus generally operates under control of at least one processor, such as the CPU 338, which is coupled to a working memory 340, program memory 342, and a graphics subsystem 344 via one or more buses (e.g., bus 350). The CPU 338 receives closed caption data from the demultiplexer 304 as well as any other supplemental data used for rendering graphics, and passes appropriate instructions and data to the graphics subsystem 344. The graphics outputted by the graphics subsystem 344 are combined with video images by the compositor and video interface 360 to produce an output suitable for display on a video display.

Further, the CPU 338 operates to carry out functions of the reception apparatus including the processing of NRT content, triggers, TDOs, EPG data, etc. For example, the CPU 338 operates to execute script objects (control objects) contained in the TDO, its trigger(s), etc., using for example a Declarative Object (DO) Engine stored in the program memory 342. The CPU 338 is also configured to determine a system time frequency, as further described below. The CPU determines the system time frequency based on information received from the tuner/demodulator 302 according to one embodiment.

Although not illustrated in FIG. 3, the CPU 338 may be coupled to any one or a combination of the reception apparatus 20 resources to centralize control of one or more functions. In one embodiment, the CPU 338 also operates to oversee control of the reception apparatus 20 including the tuner/demodulator 302 and other television resources.

Figure 4A:
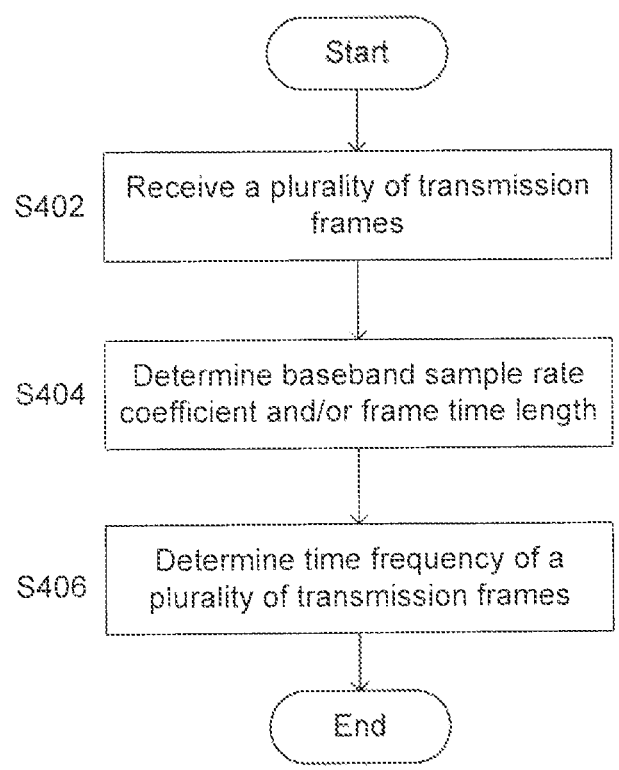
FIG. 4A illustrates a flow diagram of an exemplary method for determining a time frequency.

FIG. 4A illustrates a flow diagram of an exemplary method for determining the time frequency. As illustrated in FIG. 4A, in step S402, circuitry (e.g., the tuner/demodulator 302 implemented by the circuitry) of the reception apparatus 20 receives a plurality of transmission frames, including a first transmission frame. An example of the plurality of transmission frames is illustrated in FIG. 2B, as described above. In one embodiment, the tuner/demodulator 302 receives a broadcast wave form (e.g., a digital television broadcast signal) and provides information extracted from the broadcast wave form to the CPU 338. The tuner/demodulator 302 provides one or more bootstrap symbols to the CPU 338. The tuner/demodulator 302 also provides the preamble and payload to the CPU 338 in certain embodiments.

In step S404, the circuitry (e.g., the CPU 338 implemented by the circuitry) of the reception apparatus 20 optionally determines a baseband sample rate coefficient N signaled in the bootstrap and/or a time length TL of the first transmission frame. This step may be omitted if the baseband sample rate coefficient N and/or the time length TL was previously determined according to one embodiment. In one embodiment, the baseband sample rate coefficient N is signaled in bootstrap symbol 2 of the first transmission frame. In this case, the CPU 338 may determine the baseband sample rate coefficient N based on the bootstrap symbol 2. However, the baseband sample rate coefficient N may also, or alternatively, be signaled in other bootstrap symbol numbers or in a bootstrap of another transmission frame.

The time length TL of the first transmission frame is determined based on information received from a source that is external to the reception apparatus. In certain embodiments, the time length TL defines the millisecond length of the frame within the range 50 to 5700, or 0 to 5700, inclusive. In this case, 13 bits could be used to describe the full range of distances between bootstraps. However, other time length ranges may be utilized in other embodiments. Further, in one embodiment, the time length TL is signaled in the preamble of the first transmission frame or one or more other transmission frames.

In step S406, the circuitry (e.g., the CPU 338 implemented by the circuitry) of the reception apparatus 20 determines a time frequency based on the baseband sample rate coefficient N signaled in the bootstrap and the time length TL of the first transmission frame. The circuitry of the reception apparatus 20 determines the time frequency based on the following equation: $(384*[N+16])*TL$, where the time TL is defined in milliseconds. For example, for a 6 MHz channel and 60 millisecond frame, and where N=2 and the distance between bootstraps is 50 milliseconds, the equation yields $384*(2+16)*(50)=345600$ samples of payload sampling frequency.

Figure 6:
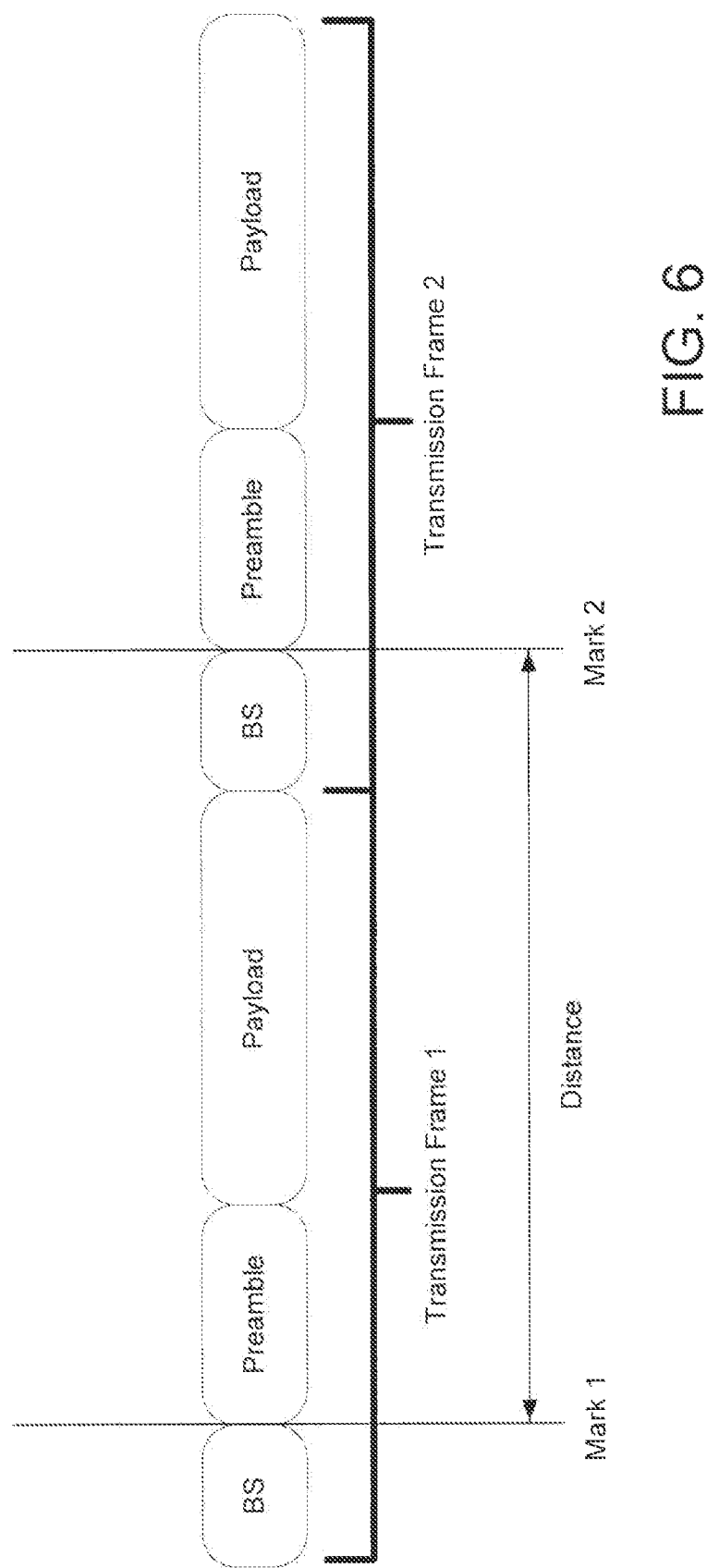
FIG. 6 illustrates a plurality of transmission frames.

The time frequency indicates a distance between the first transmission frame and the second transmission frame. In one embodiment, the time frequency indicates a distance between "ticks" or "marks" of time in a transmitted waveform, for example in the first and second transmission frames, as illustrated for example in FIG. 6. In ATSC Candidate Standard A/321, $[384*(N+16)]$ is a factor of samples N for a selected channel bandwidth to guarantee zero mean and zero jitter, and define distance in exact milliseconds. The "ticks" or "marks" may be present in each frame or in select frames. In one embodiment, when the "ticks" or "marks" are only present in select frames, the first and second transmission frames are separated by one or more other transmission frames that do not contain "ticks" or "marks" therein.

In certain embodiments, the circuitry of the reception apparatus 20 adjusts a clock (e.g., a clock for video decoding, CPU video processing) used in the middle layer to process the plurality of transmission frames. Such processing may include decoding of content for presentation to a user, or delivery and signaling of payload.

Figure 4B:
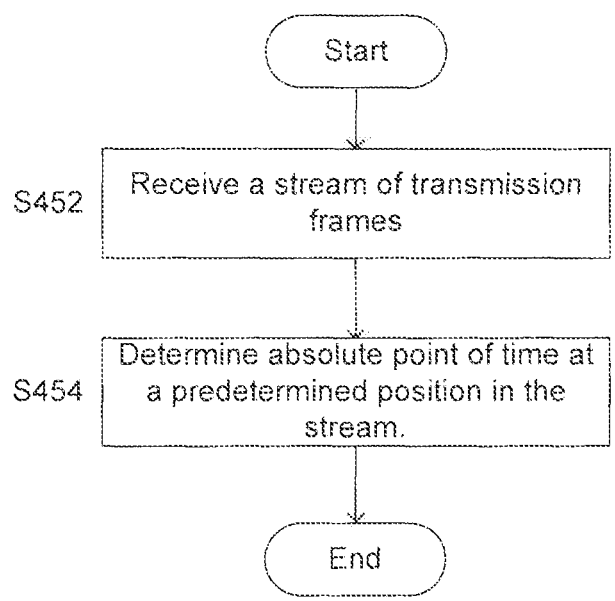
FIG. 4B illustrates a flow diagram of an exemplary method for receiving transmission frames.

FIG. 4B illustrates a flow diagram of an exemplary method for receiving transmission frames transmitted on one millisecond boundaries. As illustrated in FIG. 4B, in step S452, circuitry (e.g., the tuner/demodulator 302 implemented by the circuitry) of the reception apparatus 20 receives a stream of transmission frames. The transmission frames are transmitted on one millisecond boundaries. Further, each of the transmission frames includes a bootstrap, a preamble, and a payload.

In step S454, the circuitry (e.g., the CPU 338 implemented by the circuitry) of the reception apparatus 20 determines an absolute point of time at a predetermined position in a stream of the transmission frames based on first time information included in a first one of the transmission frames. The first time information may correspond to any of the time information further described below.

In certain embodiments, the absolute point of time is when a portion of the stream at the predetermined position is transmitted according to one embodiment. Further, the first time information is included in the preamble of the first one of the transmission frames. In one embodiment, the absolute point of time indicates a time at which a first symbol of the bootstrap in the first one of the transmission frames was transmitted. The first symbol may be aligned with one of the one millisecond boundaries on which the first one of the transmission frames is transmitted. Moreover, in one embodiment, only a subset of the transmission frames includes time information that indicate absolute points of time at different predetermined positions in the stream of the transmission frames. For example, the time information for each of the subset of the transmission frames indicates a timing associated with a predetermined position of the respective transmission frame.

Figure 5A:
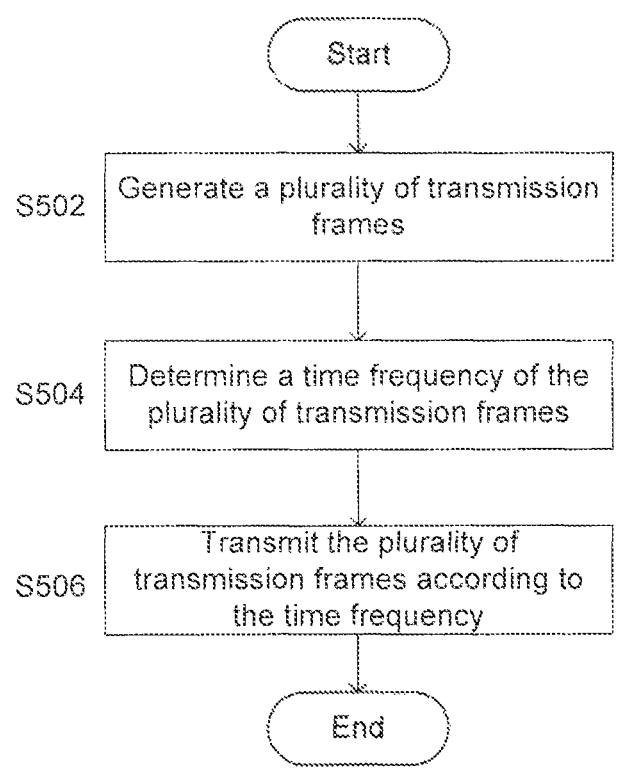
FIG. 5A illustrates a flow diagram of an exemplary method for providing a plurality of transmission frames.

FIG. 5A illustrates a flow diagram of an exemplary method for providing the plurality of transmission frames. As illustrated in FIG. 5A, in step S502, circuitry of an information providing apparatus (e.g., implemented by the transmission apparatus at the content provider 10) generates a plurality of transmission frames based on a frame time length TL. As described above, each of the transmission frames includes a bootstrap, a preamble, and a payload. As described above, the bootstrap for one, a subset, or all of the plurality of transmission frames signals a baseband sample rate coefficient N that is used by the reception apparatus 20 to determine the time frequency. Further, in certain embodiments, the frame time length TL may be signaled by the circuitry of the information providing apparatus in one or more of the transmission frames. For example, the frame time length TL may be signaled in the preamble of one of more of the plurality of transmission frames. Further, it is noted that the frame time length TL may change over time.

Figure 7:
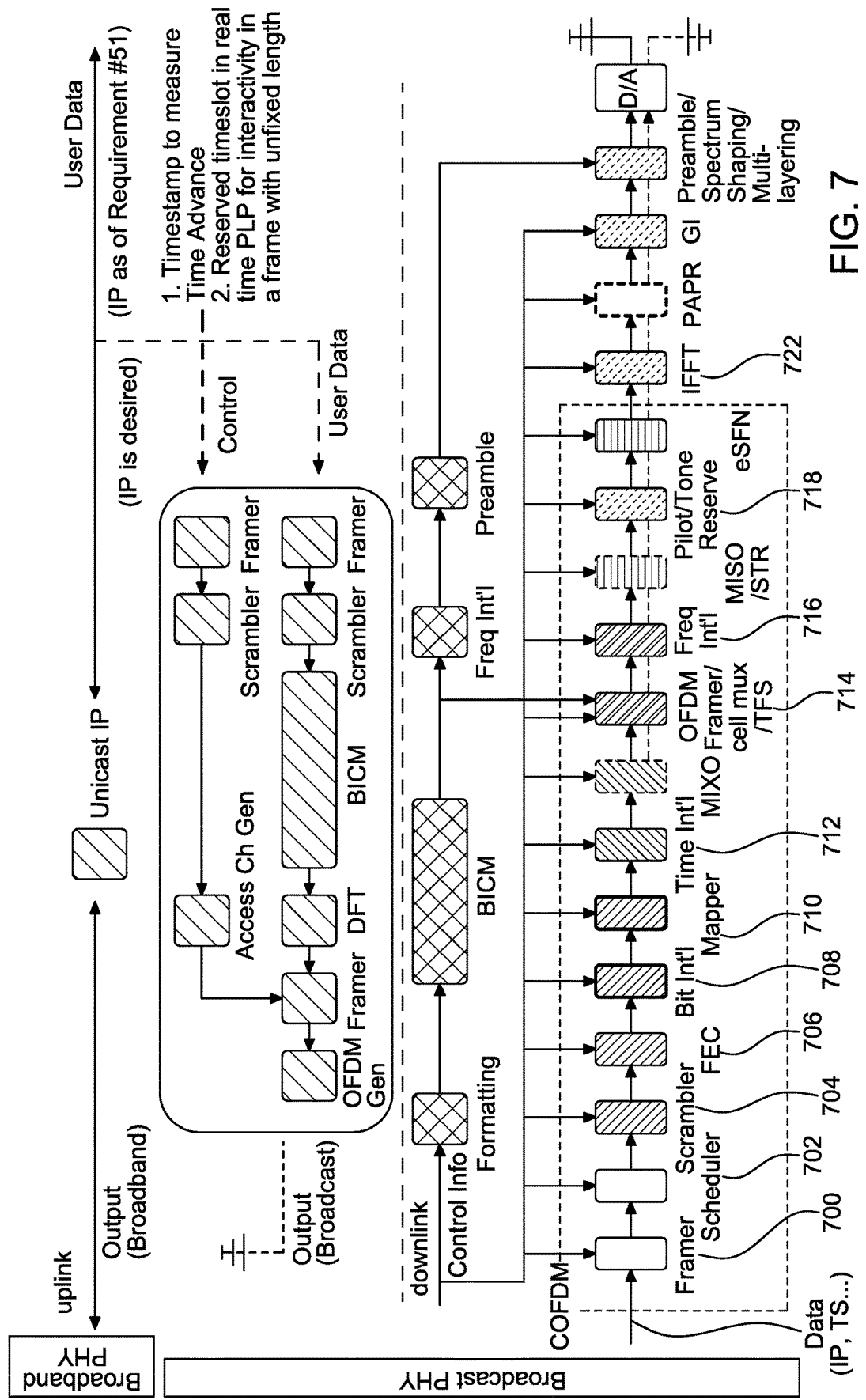
FIG. 7 illustrates a proposed ATSC 3.0 physical layer architecture according to one embodiment.

In step S504, the circuitry of the information providing apparatus optionally determines the time frequency of the plurality of transmission frames, for example when the time frequency has not been determined. Further, in step S506, the circuitry of the information providing apparatus transmits the plurality of transmission frames according to the time frequency. In one embodiment, the information providing apparatus transmits the plurality of transmission frames in accordance with the proposed ATSC 3.0 physical layer architecture as illustrated in FIG. 7.

Figure 5B:
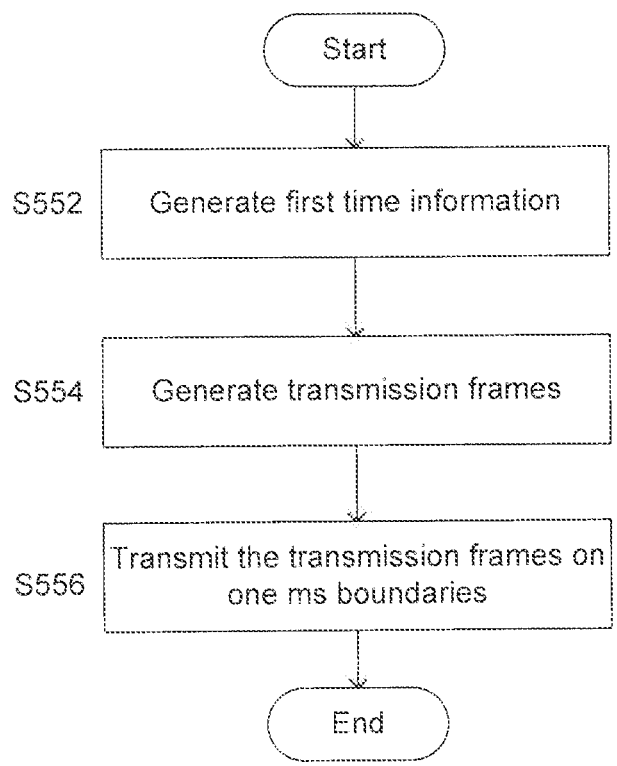
FIG. 5B illustrates a flow diagram of an exemplary method for providing a plurality of transmission frames on one millisecond boundaries.

FIG. 5B illustrates a flow diagram of an exemplary method for providing a stream of transmission frames, which are transmitted on one millisecond boundaries. As illustrated in FIG. 5B, in step S552, circuitry of an information providing apparatus (e.g., implemented by the transmission apparatus at the content provider 10) generates time information, including first time information that indicates an absolute point of time at a predetermined position in the stream of the transmission frames. The first time information may correspond to any of the time information further described below.

In certain embodiments, the absolute point of time is when a portion of the stream at the predetermined position is transmitted according to one embodiment. Further, the first time information is included in the preamble of a first one of the transmission frames. In one embodiment, the absolute point of time indicates a time at which a first symbol of the bootstrap in the first one of the transmission frames is transmitted. The first symbol may be aligned with one of the one millisecond boundaries on which the first one of the transmission frames is transmitted. Moreover, in one embodiment, only a subset of the transmission frames includes time information that indicate absolute points of time at different predetermined positions in the stream of the transmission frames. For example, the time information for each of the subset of the transmission frames indicates a timing associated with a predetermined position of the respective transmission frame.

In step S554, the circuitry of the information providing apparatus (e.g., implemented by the transmission apparatus at the content provider 10) generates a plurality of transmission frames. The generated time information is included in a first one of the transmission frames. As described above, each of the transmission frames includes a bootstrap, a preamble, and a payload.

In step S556, the circuitry of the information providing apparatus transmits the plurality of transmission frames on one millisecond boundaries. In one embodiment, the information providing apparatus transmits the plurality of transmission frames in accordance with the proposed ATSC 3.0 physical layer architecture as illustrated in FIG. 7.

FIG. 7 illustrates an ATSC 3.0 physical layer architecture according to one embodiment. ATSC 3.0 is expected to improve and add functionality for broadcast television. A framer 700 combines multiple input streams into a frame with many physical layers or pipes. The scheduler 702 and scrambler 704 place the frames in a selected order and scrambles data per pipe. A forward error correction unit 706 adds information data protection per pipe. A bit interleaver 708 randomizes data bit placement within a pipe to reduce a channel's effect. A mapper unit 710 assigns a group of data bits to a symbol per pipe. A time interleaver unit 712 randomizes symbols per pipe to reduce the channel's effect. An OFDM framer 714 combines multiple inputs into a single stream and format it is frames. A frequency interleaver 716 randomizes data cells to reduce the channel's effect. A pilots insertion unit 718 inserts pilots and reserved tones for channel estimation and synchronization. Then, the preamble that includes the a-priori information may be inserted. An IFFT unit 722 generates the COFDM waveform. The GI insertion unit inserts a repeated portion of the COFDM waveform. The guard interval is used to combat ISI and inter-carrier interference (ICI) caused by delay spread in a communication channel. The GI length may be chosen to match the level of multipath expected. For example, in digital audio broadcasting (DAB), the guard interval length is chosen as one fourth of the receiver integration period. DVB-H and ISDB-T support four different guard lengths of ¼, ⅛, ¹⁄₁₆, and ¹⁄₃₂ of a COFDM symbol or frame data. Control information provides the COFDM with parameters. For example, the control information may indicate the level of protection for certain data. The modulation type is then chosen according to the level of protection. For example, for high protection the modulation type is chosen as QPSK.

Figure 8:
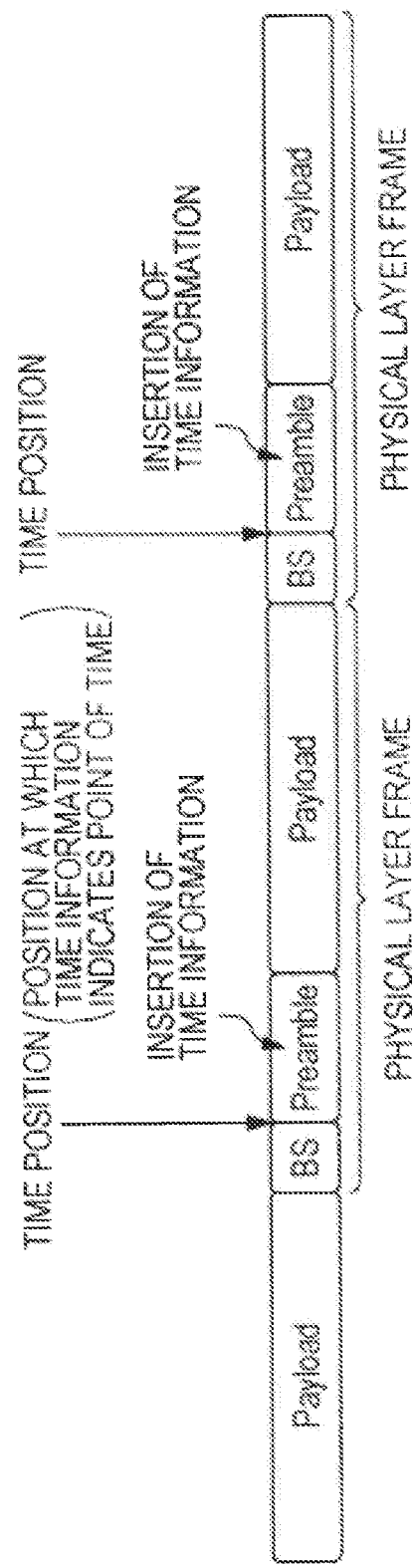
FIG. 8 is a diagram illustrating time information.

FIG. 8 is a diagram illustrating time information. In the transmission system in FIG. 1, as described in FIG. 2B, a physical layer frame in the transmission apparatus 10 is formed from an IP packet and a stream of physical layer frames is transmitted to the reception apparatus 20.

In the IP packet, time information such as PCR of TS is not transmitted. For this reason, it is desired that the time information is included in the stream of physical layer frames such that the transmission apparatus 10 and the reception apparatus 20 are synchronized with each other.

Thus, the transmission apparatus 10 may cause time information to be included in the stream of physical layer frames.

As illustrated in FIG. 8, the time information may be included in the preamble of the physical layer frame.

For example, in ATSC 3.0, bits of substantially 30 to 40 are assumed as the first preamble BS of the preambles in the physical layer frame. Accordingly, the first preamble BS may not have the sufficient number of bits for including the time information.

The time information may be included in the second preamble Preamble of the preambles in the physical layer frame.

The time information indicates an absolute point of time at a predetermined position in the stream of physical layer frames. The point of time at the predetermined position in the stream refers to a point of time at a predetermined timing in the middle of when bits at the predetermined position are processed by the transmission apparatus 10. Examples of a point of time at a predetermined timing in the middle of when bits at the predetermined position are processed by the transmission apparatus 10 include a point of time at a timing when bits at a predetermined position are output from a certain block in the transmission apparatus 10, a point of time at a timing when bits at a predetermined position are processed in a certain block in the transmission apparatus 10, and the like.

Here, a predetermined position in a stream of physical layer frames, at which time information indicates a point of time is set as a time position.

As the time position, for example, a leading position (leading position of the first preamble BS) of a physical layer frame having a preamble in which the time information is included may be employed.

As the time position, for example, a position (a tail position of the first preamble BS) (a leading position of the second preamble Preamble) of an interface between the first preamble BS and the second preamble Preamble of a physical layer frame having a preamble in which the time information is included may be employed.

As the time position, for example, a tail position of the second preamble Preamble in the physical layer frame having a preamble in which the time information is included may be employed.

In addition, as the time position, a certain position of the physical layer frame may be employed.

In the physical layer frame, a sampling frequency of the first preamble BS and a sampling frequency of fields subsequent to the second preamble Preamble may be different from each other. When the sampling frequency of the first preamble BS and the sampling frequency of the field subsequent to the second preamble Preamble, a method of counting time in the first preamble BS and a method of counting time in the fields subsequent to the second preamble Preamble are different from each other. For this reason, when a leading position of the first preamble BS is employed as the time position, regarding counting a time by using the time position as a reference, the method of performing counting in the first preamble BS and the method of performing counting in the fields subsequent to the second preamble Preamble may be required to be changed. When a leading position of the second preamble Preamble is employed as the time position, regarding counting of time by using the time position as a reference, that is, counting of time in the fields subsequent to the second preamble Preamble, the method of performing counting is not required to be changed.

In FIG. 8, the leading position (position of the interface between the first preamble BS and the second preamble Preamble) of the second preamble Preamble in the physical layer frame having the preamble in which the time information is included is employed as the time position.

The preamble (first preamble BS and second preamble Preamble) is at a predetermined position of each physical layer frame, that is, at a leading thereof and is necessarily processed at first when the physical layer frame is processed. Accordingly, it is possible to easily acquire the time information included in the preamble and perform processing on the acquired time information in the reception apparatus 20.

Since a preamble is transmitted in a relative robust manner, such a preamble may be also transmitted in the relative robust manner.

Here, as the time information, any information of a point of time may be employed. For example, information of a point of time defined by the NTP, information of a point of time defined by Third Generation Partnership Project (3GPP), information of a point of time defined by the PTP, information of a point of time included in Global Positioning System (GPS) system, information of a point of time defined by other independent schemes, and the like are included.

Figure 9:
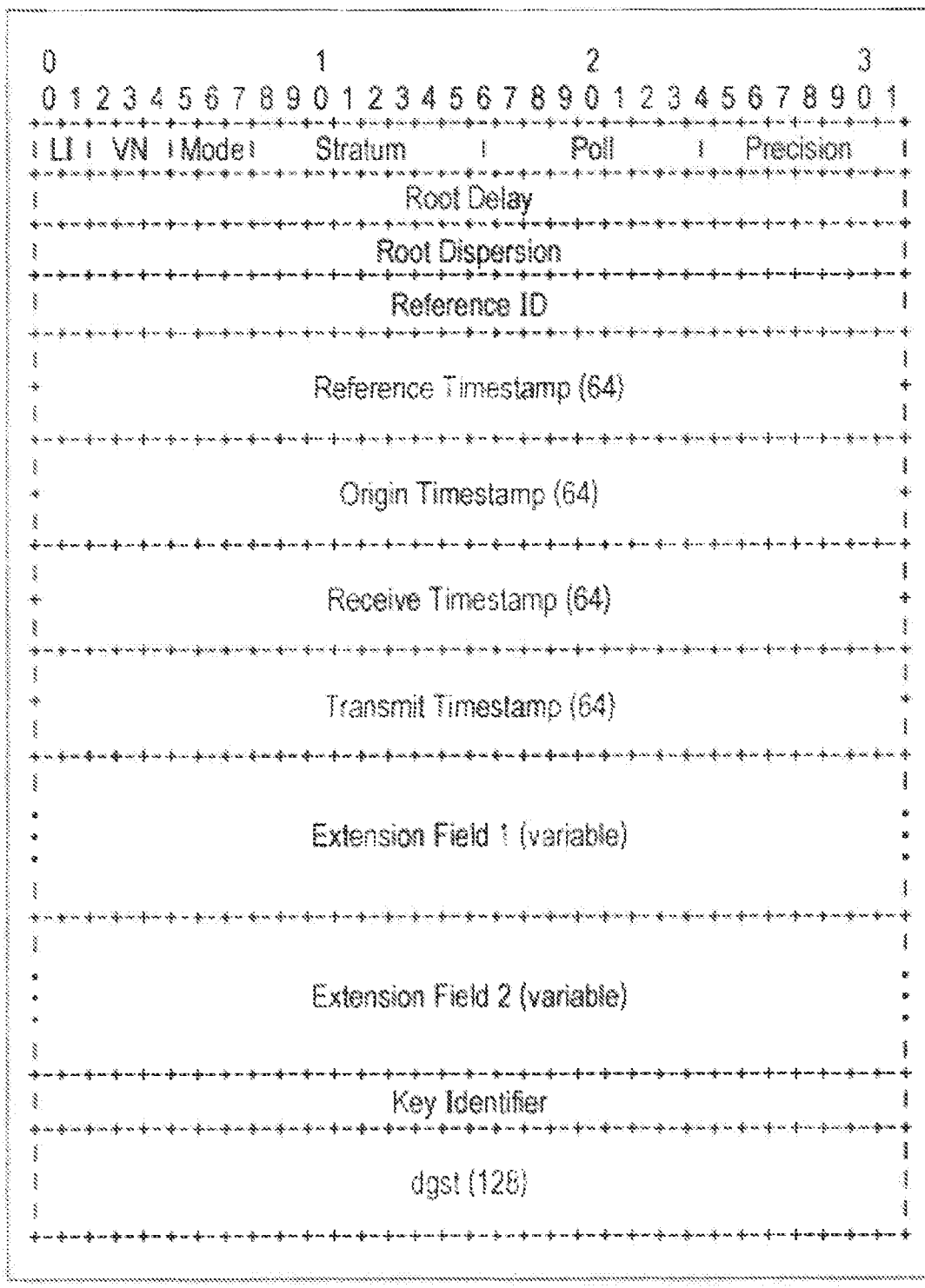
FIG. 9 is a diagram illustrating a format of an NTP packet.

FIG. 9 is a diagram illustrating a format of an NTP packet.

A 2-bit LI is an abbreviation of a Leap Indicator and indicates insertion of leap seconds into the last one minute of the current month or removal of the leap seconds from the last one minute of the current month. A 3-bit VN is an abbreviation of a version number and indicates a version of NTP. A 3-bit Mode indicates an operation mode of NTP.

An 8-bit Stratum indicates a class and is coded in accordance with the class. An 8-bit Poll indicates a polling interval, that is, the maximum interval (second unit) of continuous NTP messages. An 8-bit Precision indicates accuracy of a system clock.

Root Delay indicates a root delay, that is, indicates a round-trip delay up to a reference point of time in an NTP short form. Root Dispersion indicates dispersion of delay summation up to the reference point of time in the NTP short form. Reference ID indicates an identifier representing the reference point of time. In a broadcasting system, "0000" indicating NULL may be stored in Reference ID.

Reference Timestamp indicates a reference time stamp, that is, indicates a point of time obtained by correcting a system time for the last time, in an NTP long form. Origin Timestamp indicates a start time stamp, that is, indicates a point of time of a client when a request is transmitted to a server from the client, in the NTP long form. In the broadcasting system, "0" may be stored in Origin Timestamp.

Receive Timestamp indicates a reception time stamp, that is, indicates a point of time of the server when the request is received from the client, in the NTP long form. In the broadcasting system, "0" may be stored in Receive Timestamp. Transmit Timestamp indicates a transmission time stamp, that is, indicates a point of time of the server when a response is transmitted to the client, in the NTP long form.

In addition, the NTP packet has Extension Field 1 and Extension Field 2 which are fields for extension, Key Identifier, and dgst(message digest) as necessary.

As the time information, 64-bit information of a point of time which is represented by a similar form to the time stamp of the NTP packet such as Reference Timestamp may be employed.

Here, regarding a point of time of the 64-bit information of the time stamp in the NTP packet, there is a problem of discontinuous time due to leap seconds, but the 64-bit information of the time stamp has sufficient granularity as the time information included in the physical layer frame.

As the time information, in addition to the time stamp of the NTP packet, information of a point of time defined by 3GPP, that is, for example, timeInfo-r11 which is information of a point of time defined in 3GPP TS 36 331 may be employed.

The timeInfo-r11 is formed by 56 bits of 39-bit timeInfoUTC-r11, 2-bit dayLightSavingTime-r11, 8-bit leapSeconds-r11, and 7-bit localTimeOffset-r11. The timeInfo-r11 has slightly insufficient granularity as the time information included in the physical layer frame. However, a problem of the leap seconds does not occur.

In addition, as the time information, information of a point of time defined by PTP, that is, 80 bits of a PTP packet defined by IEEE1588 may be employed in order to represent a point of time. 48 bits represent a point of time in a second unit and other 34 bits represents a point of time in a nanosecond unit among the 80 bits of the PTP packet for representing a point of time. Thus, the information of a point of time defined by the PTP has sufficient granularity as the time information included in the physical layer frame and it is possible to represent an accurate point of time. From a view of the reception apparatus 10 reproducing the accurate point of time, the time information is desired to represent a more accurate point of time. When the information of a point of time defined by PTP is employed as the time information included in the physical layer frame, it is possible to transmit accurate time information and to cause the reception apparatus 10 to reproduce an accurate point of time. Regarding the information of a point of time defined by PTP, a problem of leap seconds does not occur.

Figure 10:
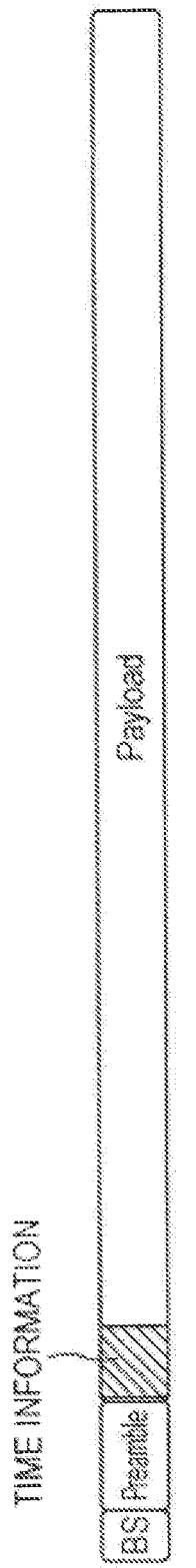
FIG. 10 is a diagram illustrating an example of a placement position of the time information.

FIG. 10 is a diagram illustrating an example of a placement position in the time information In FIG. 8, the time information is placed (included) at the preamble of the physical layer frame. However, the time information may be placed on parts other than the preamble of the physical layer frame, for example, the payload of the physical layer frame.

In FIG. 10, the time information is placed at a leading portion of the payload of the physical layer frame.

When the time information is placed at a leading portion of the payload of the physical layer frame, the reception apparatus 20 performs processing on the preamble (first preamble BS and second preamble Preamble) of the physical layer frame and then can acquire the time information placed at the leading portion of the payload.

Figure 11:
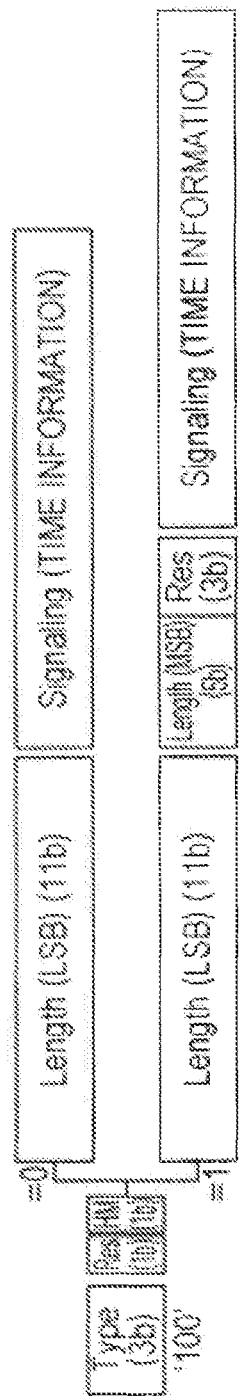
FIG. 11 is a diagram illustrating a first placement example when the time information is placed at a leading portion of a payload in a physical layer frame.

FIG. 11 is a diagram illustrating a first placement example when the time information is placed at the leading portion of the payload of the physical layer frame.

In the first placement example, the time information is placed at payload of a Generic packet at a leading portion of a BB frame which is positioned at a leading portion of payload of the physical layer frame, for the leading portion of the payload of the physical layer frame.

FIG. 11 illustrates a structure example of the Generic packet.

In the Generic packet in FIG. 11, 3-bit type information (Type) is configured at the leading portion of the Generic header. Information regarding a type of data placed in the payload of the Generic packet is configured in this type information.

When signaling information for signaling is placed in addition to the time information in the payload of the Generic packet, "100" is set in the type information of the Generic header. The next to the type information in which "100" is set, in the Generic header is set as an 1-bit reserved region (Res: Reserved), and a header mode (HM) is placed next to the reserved area.

When "0" is set in the header mode, subsequently, 11-bit length information (Length (LSB)) is placed. A length of the payload in the Generic packet is set in the length information. When "1" is set in the header mode, subsequently, 16-bit length information which is the summation of 11-bit length information (Length (LSB)) and 5-bit length information (Length (MSB)) is placed, and a 3-bit reserved region (Res) is provided.

When "0" is set in the header mode, the length information (Length (LSB)) has 11 bits. This 11-bit length information allows representing of a value in a range of 0 to 2047(=211-1) bytes as the length of the payload in the Generic packet. However, in the 11-bit length information, it is impossible to represent a length of the payload equal to or greater than 2048 bytes. Thus, when data being equal to or greater than 2048 bytes is placed in the payload, "1" is set in the header mode. In this case, 1 byte is added as a region of the Generic header and the length information has 16 bits. This 16-bit length information allows representing of a length of the payload which is equal to or greater than 2048 bytes.

Subsequently to the Generic header configured as described above, the payload is placed in the Generic packet. Here, since "100" is set in the type information of the Generic header, signaling information including the time information is placed in the payload.

FIG. 12 is a diagram illustrating type information of the Generic packet in FIG. 11.

When an IPv4 IP packet is placed in the payload of the Generic packet, "000" is set in the type information. When a compressed IP packet is placed in the payload, "001" is set in the type information. When an MPEG2-TS type TS packet is placed in the payload, "010" is set in the type information.

When the signaling information having the time information and the like is placed in the payload, "100" is set in the type information. In FIG. 12, the type information having three values of "011", "101", and "110" is set to be in a not-defined state (Reserved). When extension of the type information is insufficient only in the not-defined state (Reserved) of three values, "111" is set in the type information and thus (a region of) the type information may be extended.

Figure 13:
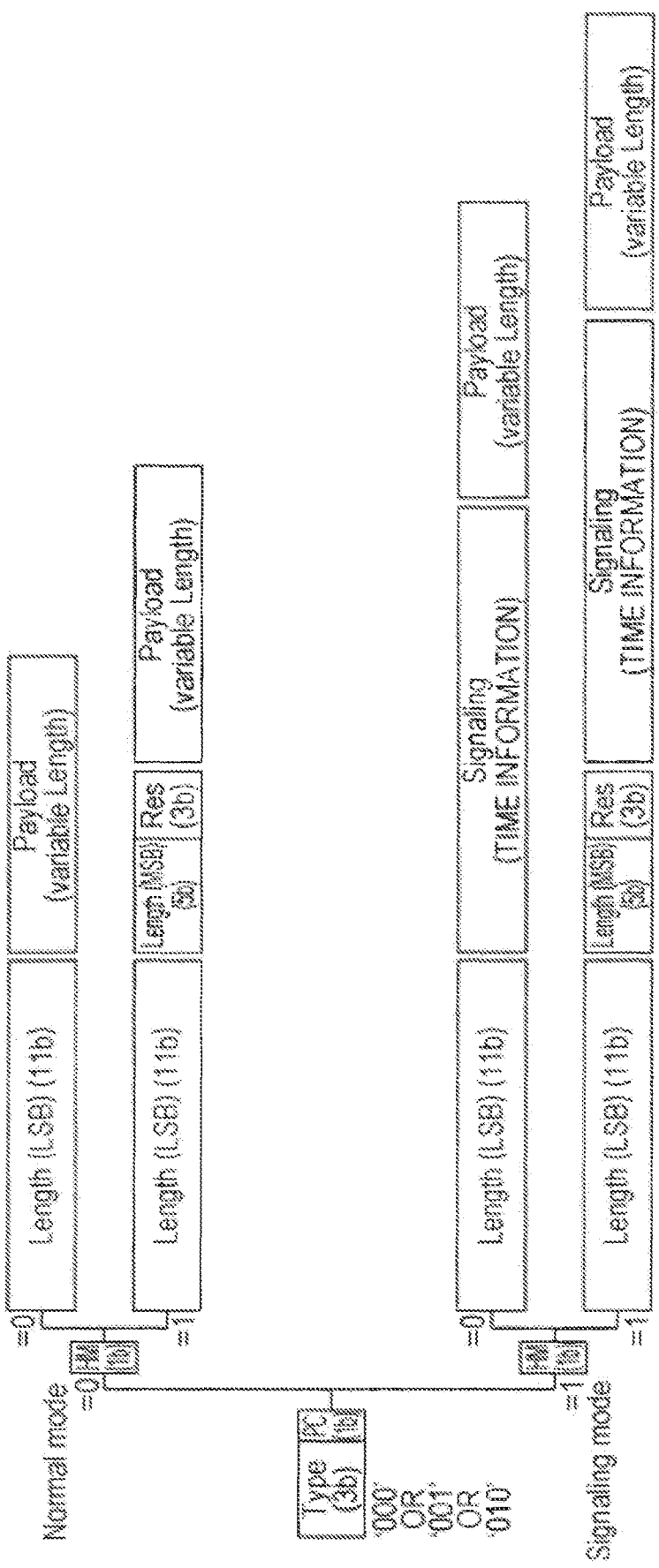
FIG. 13 is a diagram illustrating a second placement example when the time information is placed at the leading portion of the payload in the physical layer frame.

FIG. 13 is a diagram illustrating a second placement example when the time information is placed at a leading portion of the payload of the physical layer frame.

In the second placement example, the time information is placed at a header of a Generic packet at a leading portion of a BB frame which is positioned at a leading portion of payload of the physical layer frame, for the leading portion of the payload of the physical layer frame.

FIG. 13 illustrates a structure example of the Generic packet.

As described in FIG. 11, type information regarding a type of data placed in the payload of the Generic packet is set in 3-bit type information (Type) field at the leading portion of the Generic header in the Generic packet.

In the second placement example, "000", "001", or "010" is set in the 3-bit type information in the Generic header.

As described in FIG. 12, when "000" is set in the type information, an IPv4 IP packet is placed in the payload. When "001" is set in the type information, a compressed IP packet is placed in the payload. When "010" is set in the type information, a TS packet is placed in the payload.

In the Generic header, 1-bit packet configuration information (PC: Packet Configuration) is placed next to the type information in which "000", "001", or "010" is set. When "0" is set in the packet configuration information, the Generic header has a normal mode, and 11-bit length information (Length) is place or 16-bit length information and 3-bit reserved region (Res) are placed in accordance with a header mode (HM) placed next to the packet configuration information. An IPv4 IP packet, a compressed IP packet, or a TS packet is placed in the payload subsequent to the Generic header in accordance with the type information of the Generic header.

When "1" is set in the packet configuration information (PC), the Generic header has a signaling mode, and length information (Length) is placed in accordance with a header mode (HM) placed next to the packet configuration information. That is, when "0" is set as the header mode, 11-bit length information (Length (LSB)) is placed next to the header mode. The Generic header is extended, and signaling information (Signaling) including the time information is placed next to the length information.

When "1" is set in the packet configuration information (PC), if "1" is set in the header mode (HM), 16-bit length information (Length) and 3-bit reserved region (Res) are placed subsequently to the header mode. The Generic header is extended, and signaling information (Signaling) including the time information is placed next to the reserved region (Res).

A region up to this signaling information is set as the Generic header (extension header) and the payload is placed subsequent to the region. An IPv4 IP packet or a compressed IP packet is placed in the payload in accordance with the type information of the Generic header.

Figure 14:
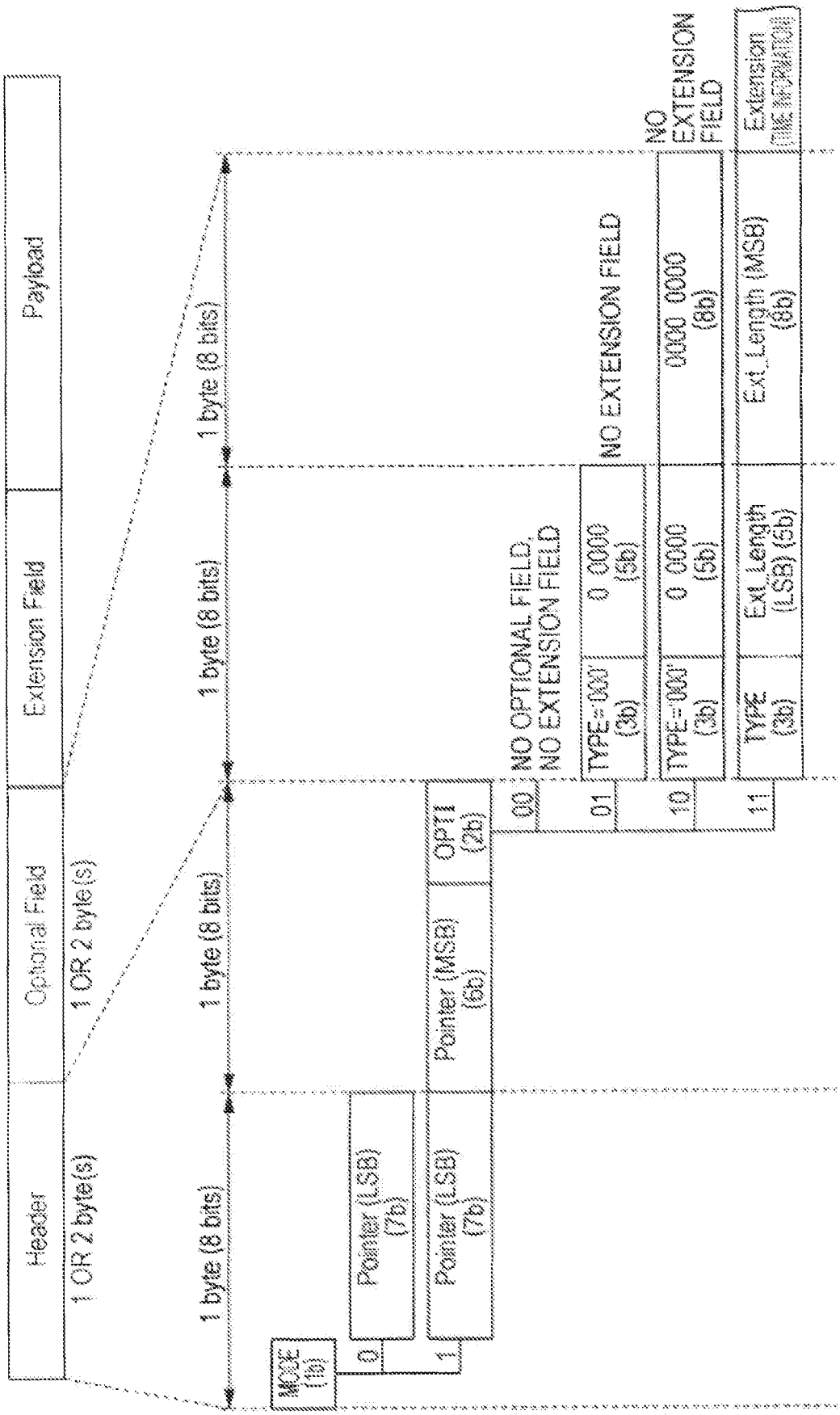
FIG. 14 is a diagram illustrating a third placement example when the time information is placed at the leading portion of the payload in the physical layer frame.

FIG. 14 is a diagram illustrating a third placement example when the time information is placed at a leading portion of the payload of the physical layer frame.

In the second placement example, the time information is placed at a BB header of a BB frame which is positioned at a leading portion of the payload of the physical layer frame, for the leading portion of the payload of the physical layer frame.

FIG. 14 illustrates a structure example of the BB frame.

In FIG. 14, the BB frame is formed from the BB header and the payload. A 1 or 2-byte optional field and an extension field in addition to a 1 or 2-byte header may be placed in the BB header.

A 1-bit mode (MODE) is configured at a leading portion of the header.

When "0" is set in the 1-bit mode (MODE), 7-bit pointer information (Pointer (LSB)) is placed. The pointer information is information for indicating a position of the Generic packet placed in the payload of the BB frame. For example, when data of the Generic packet placed at a tail of the BB frame is placed over the next BB frame, position information of the Generic packet placed at a leading portion of the next BB frame may be configured as the pointer information.

When "1" is set in the mode (MODE), 7-bit pointer information (Pointer(LSB)), 6-bit pointer information (Pointer(MSB)), and 2-bit optional flag (OPTI: OPTIONAL) are placed. The optional flag is information indicating whether or not the BB header is extended by placing an optional field and an extension field.

When extension is performed by the optional field and the extension field, "00" is set in the optional flag. When extension is performed only by the optional field, "01" or "10" is set as the optional flag. When "01" is set in the optional flag, padding of 1 byte (8 bits) is performed in the optional field. When "10" is set as the optional flag, padding of 2 bytes (16 bits) is performed in the optional field.

When extension with the optional field and the extension field is performed, "11" is set as the optional flag. In this case, 3-bit extension type information (TYPE (EXT_TYPE)) is configured at a leading portion of the optional field. Extension length information (EXT_Length (LSB)) placed next to the extension type information and information regarding a type (Extension type) of the extension field are configured in this extension type information field.

In the third placement example, signaling information including the time information is placed in the extension field (extension header).

That is, in the third placement example, "11" is set as the optional flag (OPTI) and extension with the optional field and the extension field is performed. In addition, "011" is set in the extension type information (TYPE (EXT_TYPE)) of the optional field and the signaling information including the time information is placed in the extension field.

Figure 15:
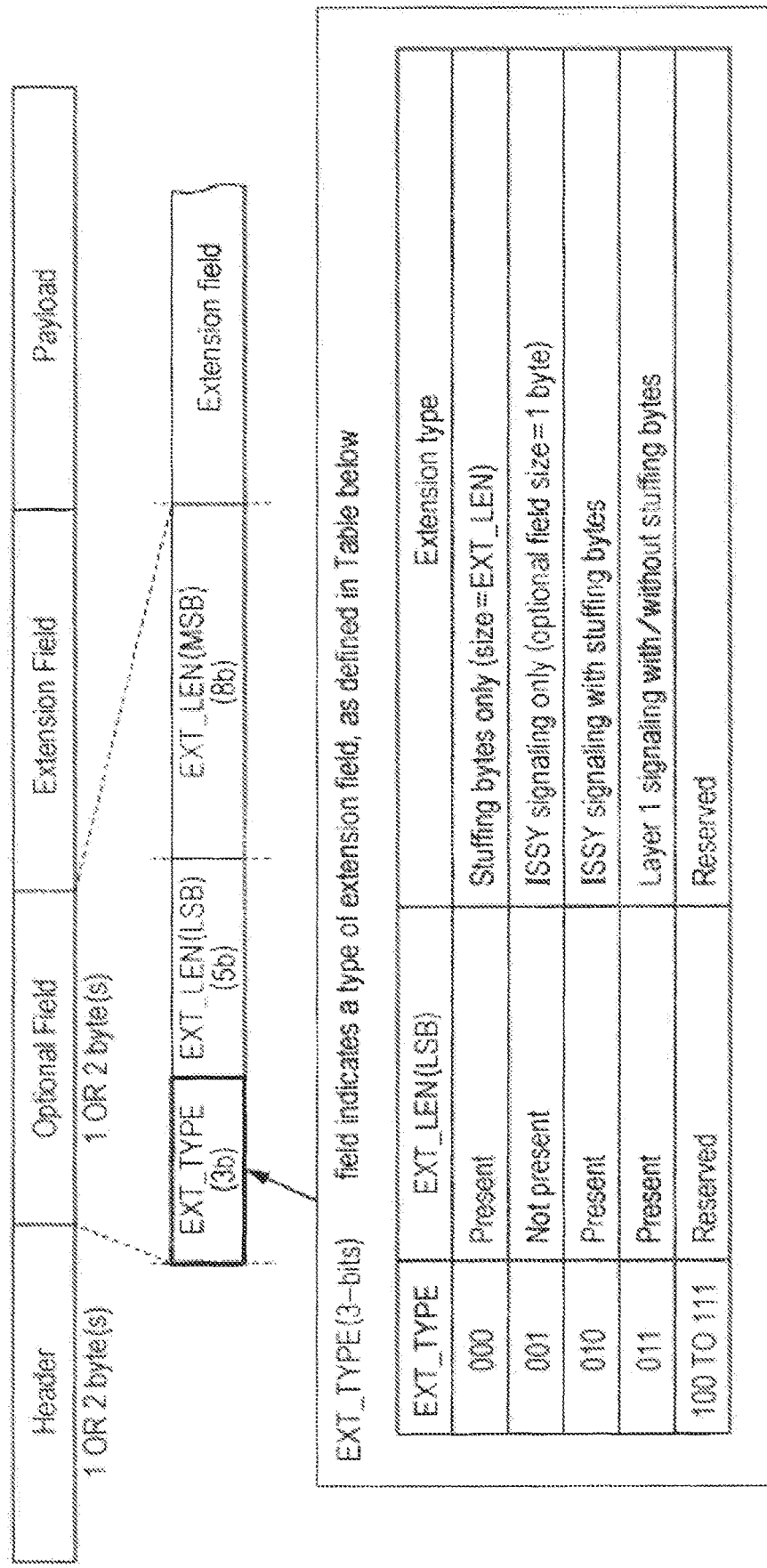
FIG. 15 is a diagram illustrating extension type information (EXT_TYPE)

FIG. 15 is a diagram illustrating the extension type information (TYPE (EXT_TYPE)) in FIG. 14.

Extension length information (EXL_Length (LSB)) placed next to the extension type information, and information regarding a type of the extension field are configured in the extension type information.

That is, when the extension length information is placed and only stuffing bytes are placed, "000" is set in the extension type information. When the extension length information is not placed and an Input Stream Synchronizer (ISSY) is placed in the extension field, "001" is set in the extension type information. When the extension length information is placed, and stuffing bytes are placed along with the ISSY in the extension field, "010" is set in the extension type information.

When the extension length information is placed, and the signaling information including the time information is placed in the extension field, "011" is set in the extension type information. In this case, it is arbitrarily determined whether or not the stuffing bytes are placed. In FIG. 15, the extension type information having "100" to "111" is in the not-defined state (Reserved).

As described above, the time information may be placed at the leading portion of the payload of the physical layer frame.

Figure 16:
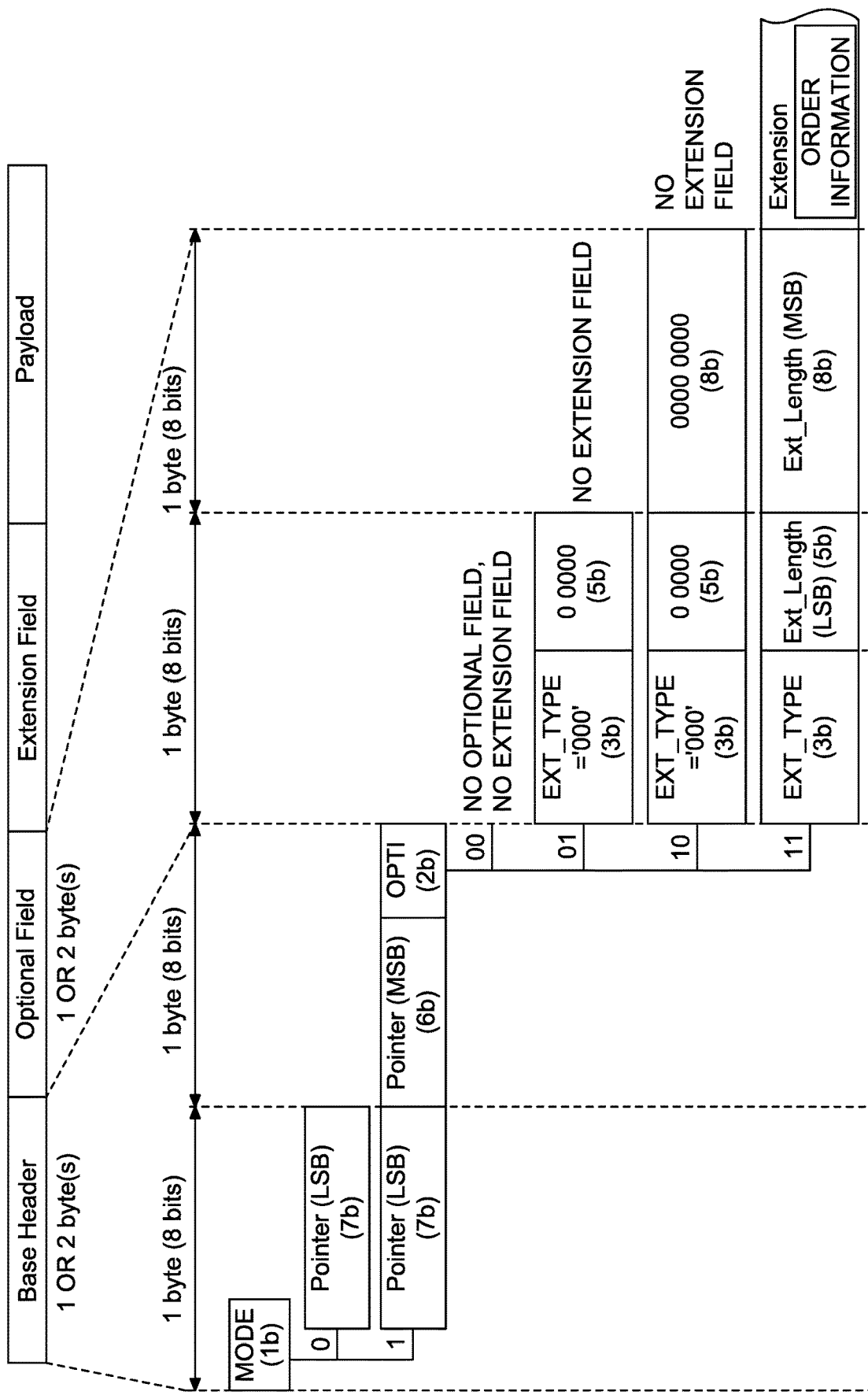
FIG. 16 is a diagram illustrating order information.

FIG. 16 is a diagram illustrating order information.

Regarding the transmission system in FIG. 1, a method of performing processing sequentially on BB frames is desired in the reception apparatus 20.

Thus, the transmission apparatus 10 may cause order information regarding an order of the BB frames to be included in the BB frame.

The order information may be included in the BB header of the BB frame, as illustrated in FIG. 16.

Here, in the following descriptions, the time information is included in, for example, the preamble (first preamble BS and second preamble Preamble) of the physical layer frame, as illustrated in FIG. 8.

FIG. 16 illustrates a structure example of the BB frame.

In FIG. 16, the BB frame is formed from a BB header and payload.

The BB header is formed by a 1 or 2-byte header (Base Header)

A 1 or 2-byte optional field and an extension field in addition to the header (Base Header) may be placed in the BB header.

A 1-bit mode (MODE) is configured at a leading of the header

When "0" is set in the 1-bit mode (MODE), 7-bit pointer information (Pointer (LSB)) is placed. The pointer information indicates a position of the Generic packet placed in the payload of the BB frame, as illustrated in FIG. 14.

When "1" is set in the mode (MODE), 13-bit (7+6) pointer information (Pointer (LSB) and Pointer (MSB)) and 2-bit optional flag (OPTI: OPTIONAL) are placed.

The 13-bit pointer information is formed from 7-bit pointer information (Pointer (LSI3)) and 6-bit pointer information (Pointer (MSB)). The 7-bit pointer information (Pointer (LSI3)) and the 6-bit pointer information (Pointer (MSB)) respectively represent lower bits of the 13-bit pointer information and upper bits of the 13-bit pointer information. The optional flag indicates whether or not the header is extended by placing an optional field and an extension field, as illustrated in FIG. 14.

When extension is performed by the optional field and the extension field, "00" is set in the optional flag. When extension is performed only by the optional field, "01" or "10" is set as the optional flag.

3-bit extension type information (TYPE (EXT_TYPE)) regarding the extension field (Extension Field) is configured at a leading of the optional field.

When "01" or "10" is set as the optional flag, "000" is set in the extension type information. "00000" of 5 bits is set next to the 3-bit extension type information of "000" in the optional field.

When "10" is set as the optional flag, "00000000" of 8 bits is set in the optional field, subsequent to the 3-bit extension type information of "000" and "00000" of 5 bits.

When "11" is set as the optional flag, the extension type information is configured in accordance with a type of the extension field, and a 5-bit EXT_Length (LSB) field, or the 5-bit EXL_Length (LSB) field and a 8-bit EXL_Length (MSB) field are configured subsequent to the extension type information.

The EXT_Length (LSB) represents 6 lower bits of information regarding the size of the extension field, for example. The EXT_Length (MSB) represents 8 upper bits of information regarding the size of the extension field, for example.

When the extension type information (EXT_TYPE) has a predetermined value, there is no EXT_Length (MSB). When the EXL_Length (MSB) is presence, the size of the extension field is represented by 13 bits obtained by setting the 5-bit EXT_Length (LSB) as lower bits and setting the 8-bit EXL_Length (MSB) as upper bits. When the EXL_Length (MSB) is absence, the size of the extension field is represented only by the 5-bit EXT_Length (LSB)

When extension with the optional field and the extension field is performed, "11" is set as the optional flag.

The order information is placed in the extension field (extension header) in accordance with the extension type information (EXT_TYPE)

That is, when the order information is included in the BB header of the BB frame, "11" is set as the optional flag (OPTI) and extension with the optional field and the extension field is performed. In addition, for example, "001" is set in the extension type information (TYPE (EXT_TYPE)) of the optional field, and the order information is placed in the extension field.

FIG. 17 is a diagram illustrating the extension type information (EXT_TYPE) in FIG. 16 when the order information is included in the BB header of the BB frame.

In FIG. 17, when the extension type information indicates "000", for example, stuffing bytes are placed in the extension field.

When the extension type information indicates "001", for example, the order information is placed in the extension field.

In FIG. 17, the extension type information having other values is in a reserved state.

Generic packets placed in the payload of the BB frames are sequentially placed, and IP packets which are placed in the payload of the Generic packets are also sequentially placed.

In this case, when an order of the BB frames is held by the order information, an order of the Generic packets placed in the payload of the BB frames is also held and an order of the IP packets placed in the payload of the Generic packets is also held.

Figure 18:
FIG. 18 is a diagram illustrating a first example of the order information.

FIG. 18 is a diagram illustrating a first example of the order information.

For example, a clock counted value obtained by counting a predetermined clock may be employed as the order information.

Here, in DVB-T2, DVB-C2, or DVB-S2, the ISSY is defined.

An Input Stream Clock Reference (ISCR) functioning as a time stamp is used as a constituent of the ISSY.

The size of the ISSY is 2 bytes or 3 bytes, and the ISCR has two types of Short and Long.

The size of the Short ISCR is 15 bits, and the 15-bit Short ISCR along with 1-bit identification information for distinguishing that the ISCR is a Short ISCR forms a 2-byte (16-bit) ISSY.

The size of the Long ISCR is 22 bits, and the 22-bit Long ISCR along with 2-bit identification information for distinguishing that the ISCR is a Long ISCR forms a 3-byte (24-bit) ISSY.

The ISCR is a counted value obtained by counting a sampling clock. The clock counted value which is information similar to such an ISCR may be employed as the order information.

In FIG. 18, for example, in the transmission apparatus 10, a system clock of the transmission apparatus 10 is counted by a counter, and, for example, a 24-bit clock counted value obtained by counting the system clock is output.

As the order information included in the BB header of the frame, for example, a clock counted value output by the counter when the BB frame is formed may be employed.

When the clock counted value is employed as the order information, the order of BB frames (or, Generic packets and IP packets) may be held in the reception apparatus 20 by using the clock counted value as the order information. In the reception apparatus 20, a time interval between the BB frames may be adjusted (held).

When, for example, the 24-bit clock counted value is employed as the order information as described above, if a clock which is counted by the counter is a clock having 6.144 MHz similarly to a sampling clock of ATSC 3.0, 1/(6.144 MHz)×224=2.73 (seconds) may be counted in a case of the 24-bit clock counted value.

When, for example, a 16-bit clock counted value is employed as the order information, if a clock which is counted by the counter is a clock having 6.144 MHz, 1/(6.144 MHz)×216=10.6 (milliseconds) may be counted in a case of the 16-bit clock counted value.

When a clock counted value obtained by counting a clock of 6.144 MHz is employed as the order information, it is desired that the clock counted value has 24 bits (3 bytes) not 16 bits, considering the length of the physical layer frame.

Figure 19:
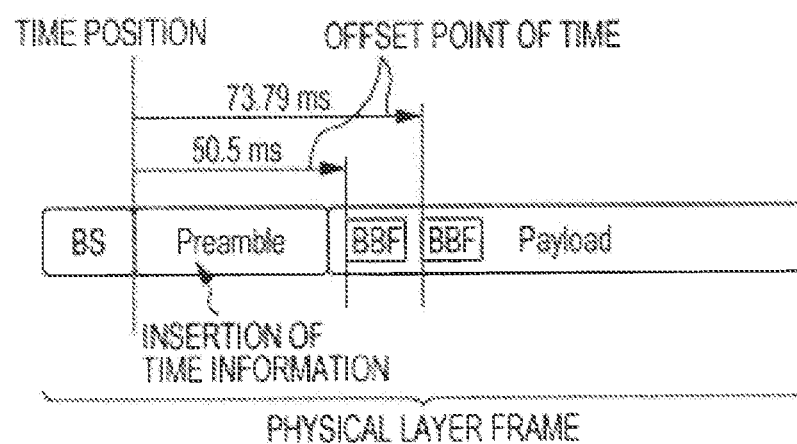
FIG. 19 is a diagram illustrating a second example of the order information.

FIG. 19 is a diagram illustrating a second example of the order information.

As the order information, for example, an offset point of time may be employed. The offset point of time represents a relative point of time at a position of the BB frame by using a point of time at a predetermined position in a stream of physical layer frames including BB frames.

As the predetermined position, for example, a time position at which time information in which the preamble of the physical layer frame is included represents a point of time, that is, for example, a position of a leading of the second preamble Preamble may be employed.

In this case, the offset point of time as the order information included in the BB header of the BB frame is set as a point of time at the position of the BB frame by using a point of time represented by the time information included in the preamble of the physical layer frame including the BB frame, as a reference.

In FIG. 19, a point of time at a position of the first BB frame (BBF) in the payload of the physical layer frame is 50.5 milliseconds if a point of time at a time position represented by the time information included in the preamble of the physical layer frame is set as a reference.

In FIG. 19, if a point of time at the time position represented by the time information included in the preamble of the physical layer frame is set as a reference, a point of time at a position of the second frame (BBF) in the payload of the physical layer frame is 73.79 milliseconds.

Here, if a unit time of the offset point of time as the order information is, for example, 10 microseconds, for example, and if the offset point of time is 16 bits (2 byte), a time of 0.65536 seconds (about 655 milliseconds)=10 microseconds×216 may be represented.

0.65536 seconds is a period of time which is equal to or greater than the maximum length of the physical layer frame and the like of ATSC 3.0, for example. Accordingly, using of the 16-bit offset point of time as the order information allows a point of time of each of the BB frames to be represented by using a point of time at the time position represented by the time information included in the preamble of the physical layer frame in which the BB frame is included, as a reference.

Figure 20:
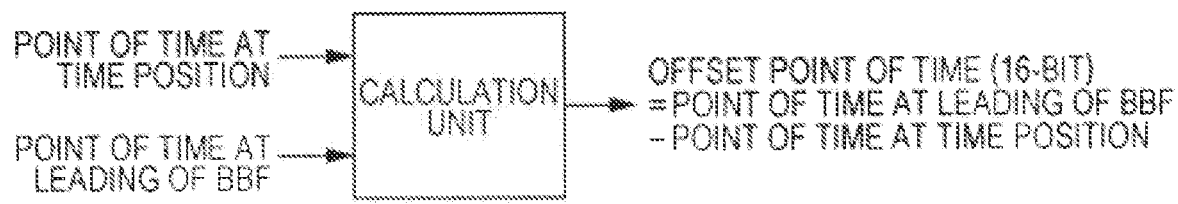
FIG. 20 is a diagram illustrating a method of generating a 16-bit offset point of time as the second example of the order information.

FIG. 20 is a diagram illustrating an example of a method of generating the 16-bit offset point of time as the second example of the order information In FIG. 20, for example, in the transmission apparatus 10, the time position, that is, a difference between a point of time at a position of the leading of the second preamble of the physical layer frame and a point of time at a position of the leading of the BB frame (BBP) included in the physical layer frame is calculated as the 16-bit offset point of time by a calculation unit.

When the offset point of time is employed as the order information, an order or a time interval of BB frames may be held in the reception apparatus 20 by using the clock counted value as the order information, similarly to a case where the clock counted value is employed.

Figure 21:
FIG. 21 is a diagram illustrating a third example of the order information.

FIG. 21 is a diagram illustrating a third example of the order information.

For example, a frame counted value obtained by counting BB frames may be employed as the order information.

In FIG. 21, for example, BB frames formed by the transmission apparatus 10 are counted by the counter in the transmission apparatus 10, and an 8-bit frame counted value obtained by counting the BB frames is output.

As the order information included in the BB header of the frame, for example, the frame counted value output by the counter when the BB frames are formed may be employed.

When the frame counted value is employed as the order information, an order of BB frames may be held in the reception apparatus 20 by using the frame counted value as the order information, similarly to a case where the clock counted value or the offset point of time is employed. However, when the frame counted value is employed as the order information, it is difficult to hold a time interval between BB frames in the reception apparatus 20.

When the frame counted value is employed as the order information, the frame counted value is sufficient for holding an order of BB frames in each physical layer frame, as long as the maximum number of BB frames included in the physical layer frame is counted.

Accordingly, the size of the frame counted value may be, for example, 8 bits (1 byte).

Here, for example, as in this embodiment, when 24 bits, 16 bits, and 8 bits are respectively used as the sizes of the clock counted value, the offset point of time, and the frame counted value, the 8-bit frame counted value is the most advantageous, from a view of a small overhead of the BB frame.

Figure 22:
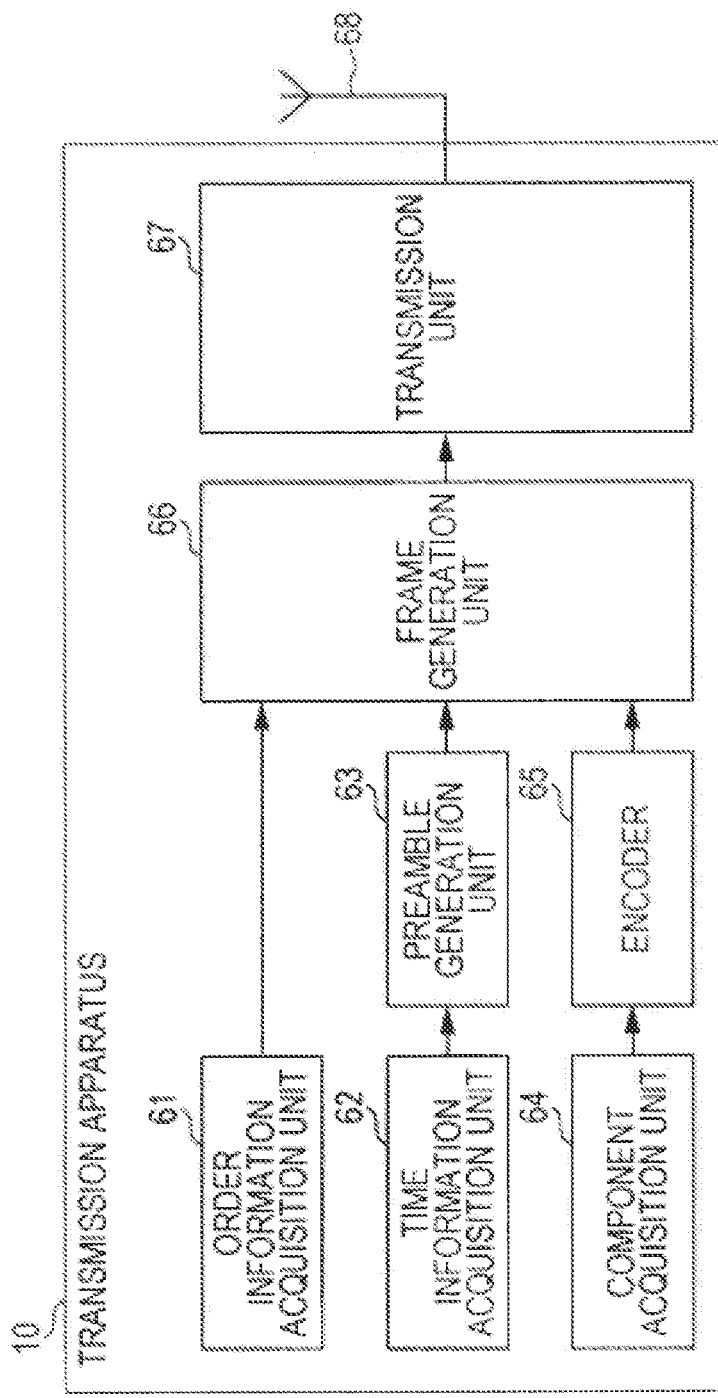
FIG. 22 is a diagram illustrating a structure example of a transmission apparatus.

FIG. 22 is a block diagram illustrating a structure example of the transmission apparatus 10 in FIG. 1

In FIG. 22, the transmission apparatus 10 includes an order information acquisition unit 61, a time information acquisition unit 62, a preamble generation unit 63, a component acquisition unit 64, an encoder 65, a frame generation unit 66, a transmission unit 67, and an antenna 68.

The order information acquisition unit 61 acquires (generates) the order information and supplies the generated order information to the frame generation unit 66.

The time information acquisition unit 62 acquires the time information and supplies the generated time information to the preamble generation unit 63. The time information is acquired as follows. That is, if packets necessary for forming of the BB frame are arrived to a scheduler (not illustrated), a physical layer frame formed to include the BB frame is obtained, and a point T of time at the leading of the second preamble Preamble of the obtained physical layer frame is obtained from a point t of time when the BB frame is generated by the frame generation unit 66. The point T of time is supplied to the time information acquisition unit 62 as a control signal from the scheduler. The time information is included in the second preamble Preamble by the preamble generation unit 63 which will be described later. The time information may be used in SFN synchronization.

The preamble generation unit 63 generates a preamble (first preamble BS and second preamble Preamble) including the second preamble Preamble including time information from the time information acquisition unit 62, and supplies the generated preamble to the frame generation unit 66.

The component acquisition unit 64 acquires data of an image or sound as a component constituting a service (for example, program), and supplies the acquired data to the encoder 65.

That is, the component acquisition unit 64 acquires contents corresponding to a broadcasting time zone, from a storage place of contents which have been stored already, or acquires live contents from a studio or a location place. The component acquisition unit 64 supplies (data of) the acquired contents to the encoder 65.

The encoder 65 codes data of an image or sound which is supplied from the component acquisition unit 64, in a predetermined encoding method. The encoder 65 supplies the coded data to the frame generation unit 66 in, for example, a form of an IP packet.

The frame generation unit 66 generates (forms) a physical layer frame by appropriately using the order information from the order information acquisition unit 61, the preamble from the preamble generation unit 63, and the IP packet from the encoder 64. The frame generation unit 66 supplies the generated physical layer frame to the transmission unit 67.

That is, the frame generation unit 66 forms a Generic packet in which the IP packet from the encoder 65 is placed. The frame generation unit 66 places the Generic packet in payload of a BB frame and forms the BB frame in which the order information of the order information acquisition unit 61 is included in a BB header The frame generation unit 66 forms a FEC frame from the BB frame. The frame generation unit 66 performs necessary processing and thus places a result of processing in payload of the physical layer frame.

The frame generation unit 66 forms the physical layer frame by adding the preamble from the preamble generation unit 63 to the payload of the physical layer frame, and supplies the formed physical layer frame to the transmission unit 67.

The transmission unit 67 performs processing such as digital modulation of the physical layer frame from the frame generation unit 66, and upconversion. The transmission unit 67 transmits a result of processing as a digital broadcasting signal through the antenna 68.

In the transmission apparatus 10 in FIG. 22, it is not necessary that all functional blocks are physically disposed in one apparatus. At least some functional blocks may constitute an apparatus which is physically independent from other functional blocks.

Figure 23:
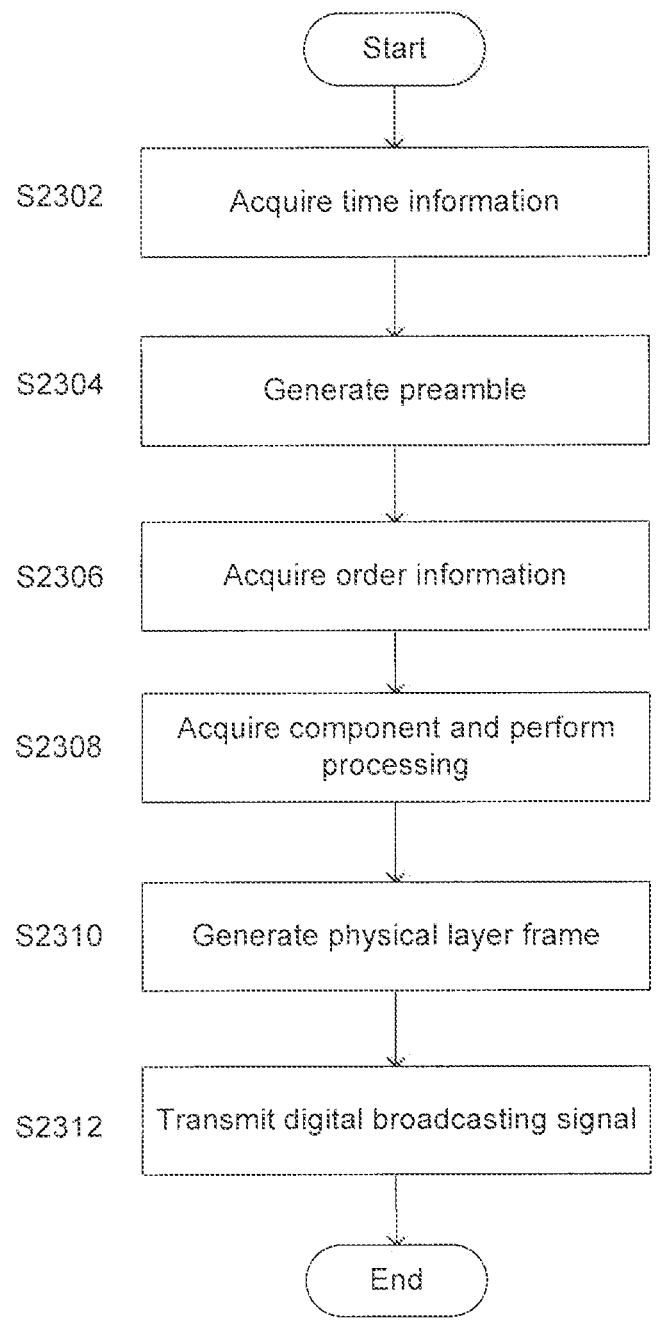
FIG. 23 is a flowchart illustrating an example of transmission processing which is performed by the transmission apparatus.

FIG. 23 is a flowchart illustrating an example of transmission processing which is performed by the transmission apparatus 10 in FIG. 22.

In step S2302, the time information acquisition unit 62 acquires time information and supplies the acquired time information to the preamble generation unit 63. The process proceeds to step S2304.

In step S2304, the preamble generation unit 63 generates a preamble of a physical layer frame in which the time information from the time information acquisition unit 62 is included in a second preamble Preamble, and supplies the generated preamble to the frame generation unit 66. The process proceeds to step S2306.

In step S2306, the order information acquisition unit 61 acquires order information and supplies the acquired order information to the frame generation unit 66. The process proceeds to step S2308.

In step S2308, the component acquisition unit 64 acquires data of an image or sound as a component constituting a service, and supplies the acquired data to the encoder 65.

The encoder 65 performs processing such as coding of the data of an image or sound, which is supplied from the component acquisition unit 64. The encoder 65 supplies a result of processing in a form of an IP packet to the frame generation unit 66. Then, the process proceeds to step S2310.

In step S2310, the frame generation unit 66 generates a physical layer frame by appropriately using the order information from the order information acquisition unit 61, the preamble from the preamble generation unit 63, and the IP packet from the encoder 64. The frame generation unit 66 supplies the generated physical layer frame to the transmission unit 67. Then, the process proceeds to step S2312.

In step S2312, the transmission unit 67 transmits the physical layer frame from the frame generation unit 66 as a digital broadcasting signal through the antenna 68.

Figure 24:
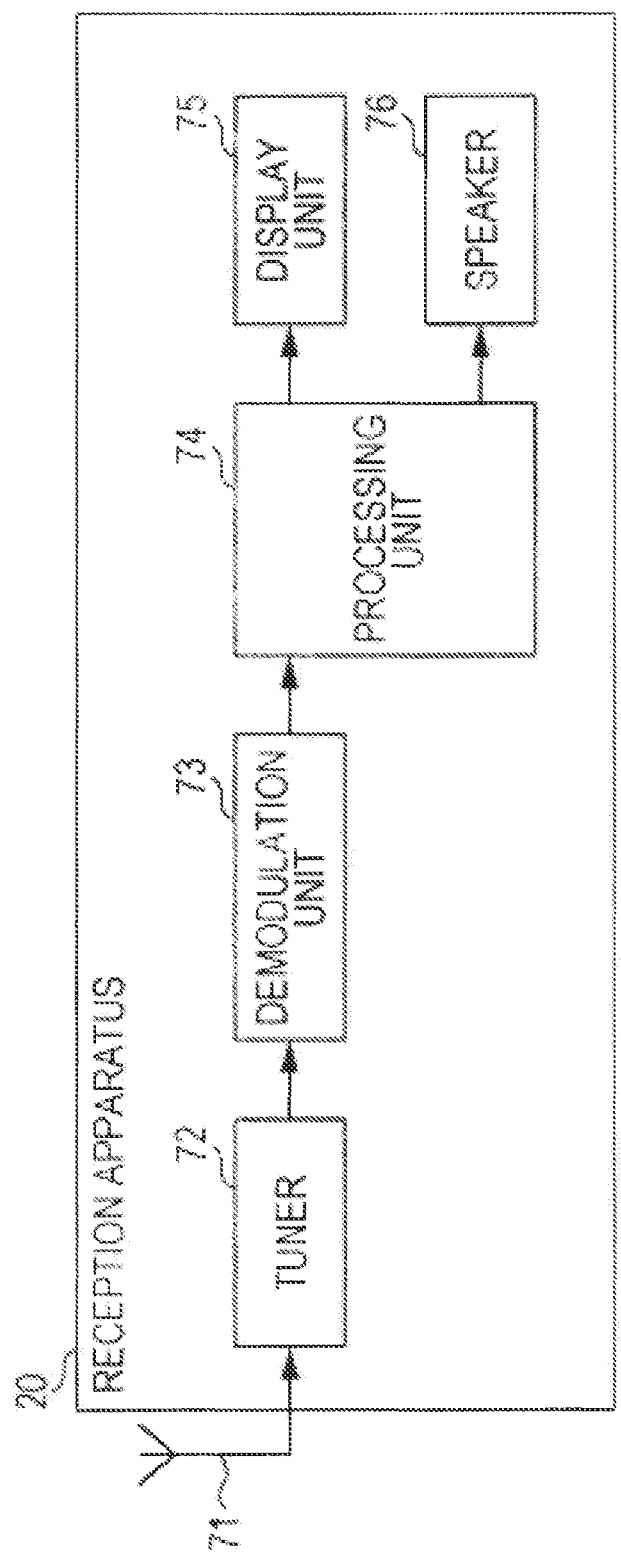
FIG. 24 is a block diagram illustrating a structure example of a reception apparatus.

FIG. 24 is a block diagram illustrating a structure example of the reception apparatus 20 in FIG. 1.

In FIG. 24, the reception apparatus 20 is configured from an antenna 71, a tuner 72, a demodulation unit 73, a processing unit 74, a display unit 75, and a speaker 76.

The antenna 71 receives a digital broadcasting signal from the transmission apparatus 10 and supplies the received digital broadcasting signal to the tuner 72.

The tuner 72 receives a physical layer frame transmitted on a predetermined frequency channel, by selecting the predetermined frequency channel component from the digital broadcasting signal received from the antenna 71. The tuner 72 supplies the received physical layer frame to the demodulation unit 73.

The demodulation unit 73 performs demodulation processing for the physical layer frame supplied from the tuner 72.

That is, the demodulation unit 73 demodulates the preamble (first preamble BS and second preamble Preamble) of the physical layer frame. The demodulation unit 73 demodulates the payload of the physical layer frame by using a demodulation result of the preamble as necessary.

The demodulation unit 73 demodulates (decodes) the FEC frame obtained by demodulating the payload of the physical layer frame.

The demodulation unit 73 demodulates the Generic packet from the BB frame obtained as a result of demodulation, and demodulates the IP packet from the demodulated Generic packet. The demodulation unit 73 supplies the demodulated IP packet to the processing unit 74.

The demodulation unit 73 acquires the time information included in the preamble of the physical layer frame or the order information included in the BB header of the BB frame in the demodulation processing. The demodulation unit 73 supplies the acquired information to the processing unit 74

The processing unit 74 decodes an image or sound of program from the IP packet received from the demodulation unit 73. The processing unit 74 supplies the image to the display unit 75 and supplies the sound to the speaker 76.

The processing unit 74 (or demodulation unit 73) performs necessary processing by using the time information or the order information from the demodulation unit 73.

That is, for example, the processing unit 74 (or demodulation unit 73) performs processing of synchronization with the transmission apparatus 10 by using the time information. The processing unit 74 performs processing of holding an order or a time interval of BB frames (order or time interval of IP packets included in the payload of the Generic packet placed in the BB frames) by using the order information. In addition, the time information may be applied to synchronization such as SFN synchronization of DVI3-T.2, for example.

The display unit 75 displays the image from the processing unit 74. The speaker 76 outputs the sound from the processing unit 74.

In the reception apparatus 20 in FIG. 24, a configuration in which the display unit 75 and the speaker 76 are built-in is described. However, the display unit 75 and the speaker 76 may be provided externally.

Figure 25:
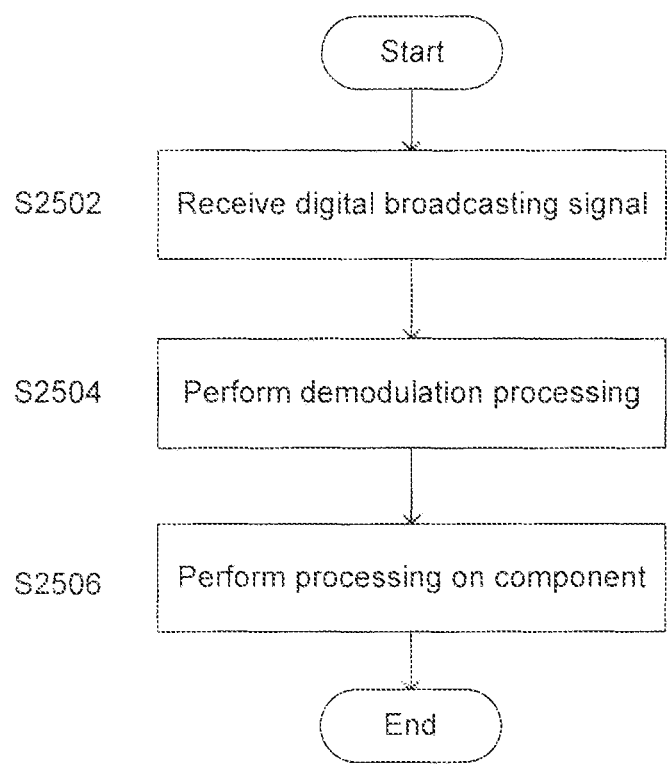
FIG. 25 is a flowchart illustrating reception processing which is performed by the reception apparatus.

FIG. 25 is a flowchart illustrating reception processing performed by the reception apparatus 20 in FIG. 24.

In step S2502, the tuner 72 receives a physical layer frame from a digital broadcasting signal received from the antenna 71 and supplies the received physical layer frame to the demodulation unit 73. The process proceeds to S2504.

In step S2504, the demodulation unit 73 performs demodulation processing for the physical layer frame supplied from the tuner 72, and supplies the IP packet, the time information, and the order information which are obtained as a result of the demodulation processing, to the processing unit 74. Then, the process proceeds to step S2506.

In step S2506, the processing unit 74 performs processing of synchronization with the transmission apparatus 10 by using the time information. The processing unit 74 performs processing of holding an order of BB frames (order of IP packets included in the payload of the Generic packet placed in the BB frames) by using the order information.

The processing unit 74 performs synchronization with the transmission apparatus 10. The processing unit 74 decodes an image or sound of program from IP packets received from the demodulation unit 73 in a state where an order of BB frames is held. The processing unit 74 supplies the image to the display unit 75 and performs display, and supplies the sound to the speaker 76 and outputs the supplied sound.

As described above, in the transmission system in FIG. 1, the transmission apparatus 10 performs transmission in a state where the time information is included in the preamble of the physical layer frame and performs transmission in a state where the order information is included in the BB header of the BB frame. Thus, it is possible to efficiently transmit the time information or the order information.

In the transmission system in FIG. 1, the reception apparatus 20 performs processing by using the time information included in the preamble of the physical layer frame and using the order information included in the BB header of the BB frame. Thus, it is possible to rapidly perform the processing.

In the above descriptions, the IP packet is transmitted in the transmission system in FIG. 1. However, data other than the IP packet may be transmitted. That is, for example, when the clock counted value or the offset point of time which can adjust a time interval between BB frames is employed as the order information, for example, the TS packet may be transmitted.

Figure 26:
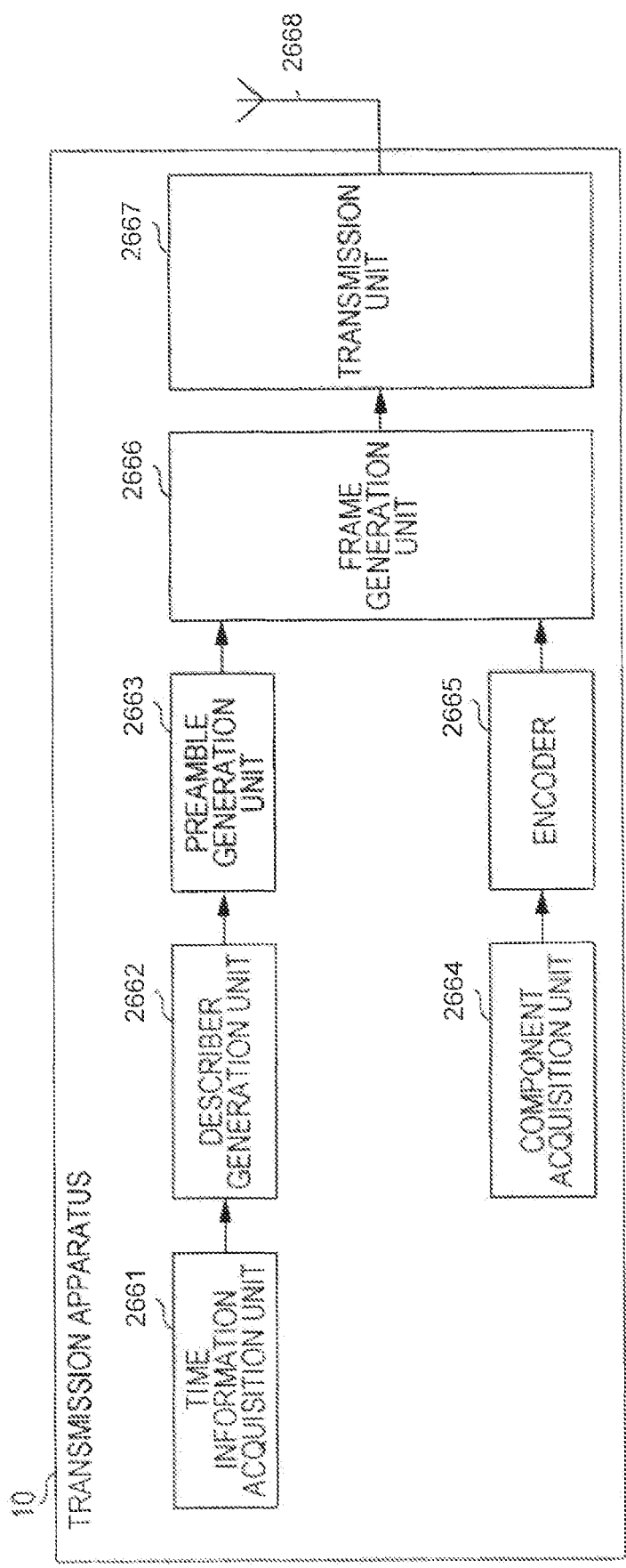
FIG. 26 is a block diagram illustrating a structure example of a transmission apparatus.

FIG. 26 is a block diagram illustrating a structure example of the transmission apparatus 10 in FIG. 1.

In FIG. 26, the transmission apparatus 10 includes a time information acquisition unit 2661, a describer generation unit 2662, a preamble generation unit 2663, a component acquisition unit 2664, an encoder 2665, a frame generation unit 2666, a transmission unit 2667, and an antenna 2668.

The time information acquisition unit 2661 acquires time information and supplies the acquired time information to the describer generation unit 2662. The time information is acquired as follows. That is, if packets necessary for forming of the BB frame are arrived to a scheduler (not illustrated), a physical layer frame formed to include the BB frame is obtained and a point T of time at the leading of the second preamble Preamble of the obtained physical layer frame is obtained from a point t of time when the BB frame is generated by the frame generation unit 2666. The point T of time is supplied to the time information acquisition unit 2661 as a control signal from the scheduler. The time information may be used in SFN synchronization.

The describer generation unit 2662 generates a time information describer including the time information received from the time information acquisition unit 2661, and supplies the generated time information describer to the preamble generation unit 2663.

The preamble generation unit 2663 generates a preamble (first preamble BS and second preamble Preamble) in which the time information describer received from the describer generation unit 2662 is included in, for example, the second preamble Preamble. The preamble generation unit 2663 supplies the generated preamble to the frame generation unit 2666.

The component acquisition unit 2664 acquires data of an image or sound as a component constituting a service (for example, program), and supplies the acquired data to the encoder 2665.

That is, the component acquisition unit 2664 acquires contents corresponding to a broadcasting time zone, from a storage place of contents which have been stored already, or acquires live contents from a studio or a location place. The component acquisition unit 2664 supplies (data of) the acquired contents to the encoder 2665.

The encoder 2665 codes data of an image or sound which is supplied from the component acquisition unit 2664, in a predetermined encoding method. The encoder 2665 supplies the coded data to the frame generation unit 2666 in, for example, a form of an IP packet.

The frame generation unit 2666 generates (forms) a physical layer frame by appropriately using the preamble from the preamble generation unit 2663, and the IP packet from the encoder 2664. The frame generation unit 2666 supplies the generated physical layer frame to the transmission unit 2667.

That is, the frame generation unit 2666 forms a Generic packet in which the IP packet from the encoder 2665 is placed, as described in FIG. 2B. The frame generation unit 2666 forms a BB frame in which the Generic packet is placed in payload of the BB frame.

The frame generation unit 2666 forms a FEC frame from the BB frame. The frame generation unit 2666 performs necessary processing and thus places a result of processing in payload of the physical layer frame.

The frame generation unit 2666 forms the physical layer frame by adding the preamble from the preamble generation unit 2663 to the payload of the physical layer frame, and supplies the formed physical layer frame to the transmission unit 2667.

The transmission unit 2667 performs processing such as digital modulation of the physical layer frame from the frame generation unit 2666, and upconversion. The transmission unit 2667 transmits a result of processing as a digital broadcasting signal through the antenna 2668.

Figure 27:
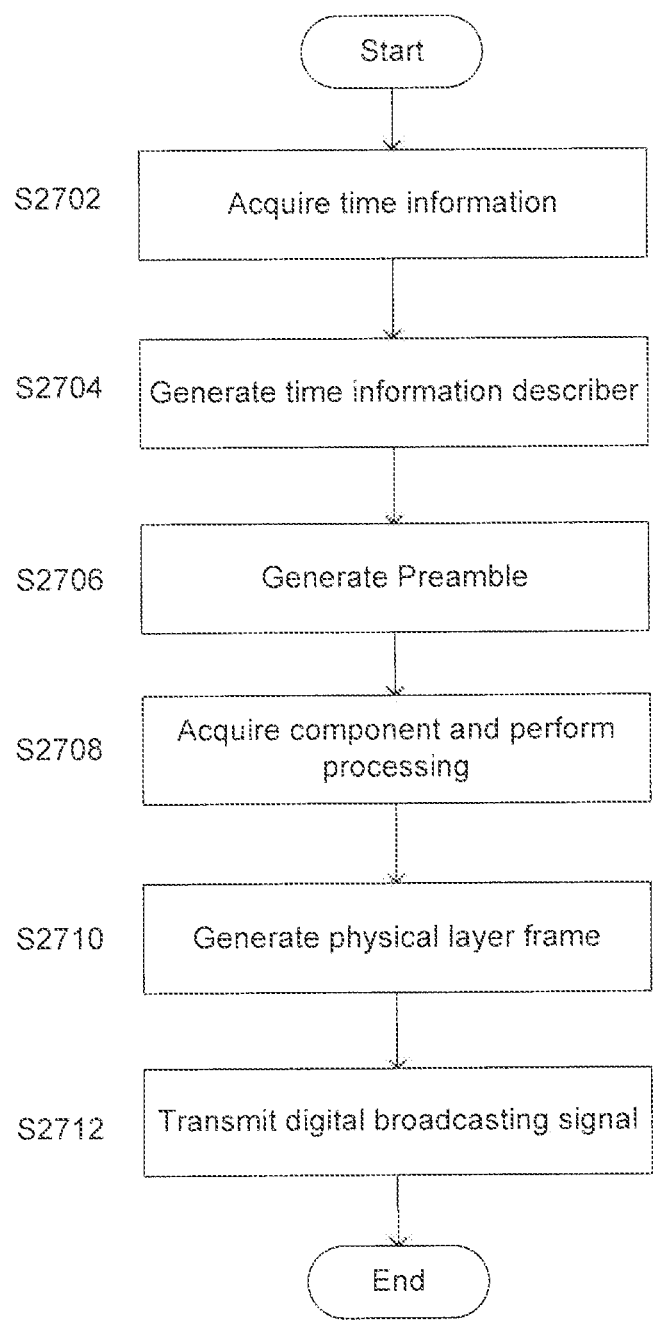
FIG. 27 is a flowchart illustrating an example of transmission processing which is performed by the transmission apparatus.

In the transmission apparatus 10 in FIG. 26, it is not necessary that all functional blocks are physically disposed in one apparatus. At least some functional blocks may constitute an apparatus which is physically independent from other functional blocks FIG. 27 is a flowchart illustrating an example of transmission processing which is performed by the transmission apparatus 10 in FIG. 26.

In step S2702, the time information acquisition unit 2661 acquires time information and supplies the acquired time information to the describer generation unit 2662. The process proceeds to step S2704.

In step S2704, the describer generation unit 2662 generates a time information describer which includes the time information from the time information acquisition unit 2661, as necessary. The describer generation unit 2662 supplies the generated time information describer to the preamble generation unit 2663 and then the process proceeds to step S2706.

In step S2706, the preamble generation unit 2663 generates the preamble of the physical layer frame in which the time information describer from the describer generation unit 2662 is included in the second preamble Preamble. The preamble generation unit 2663 supplies the generated preamble to the frame generation unit 2666 and then the process proceeds to step S2708.

In step S2708, the component acquisition unit 2664 acquires data of an image or sound as a component constituting a service, and supplies the acquired data to the encoder 2665.

The encoder 2665 performs processing such as coding of the data of an image or sound, which is supplied from the component acquisition unit 2664. The encoder 2665 supplies a result of processing in a form of an IP packet to the frame generation unit 2666. Then, the process proceeds to step S2710 from step S2708.

In step S2710, the frame generation unit 2666 generates a physical layer frame by appropriately using the preamble from the preamble generation unit 2663, and the IP packet from the encoder 2664. The frame generation unit 2666 supplies the generated physical layer frame to the transmission unit 2667. Then, the process proceeds to step S2712.

In step S2712, the transmission unit 2667 transmits the physical layer frame from the frame generation unit 2666 as a digital broadcasting signal through the antenna 2668.

Figure 28:
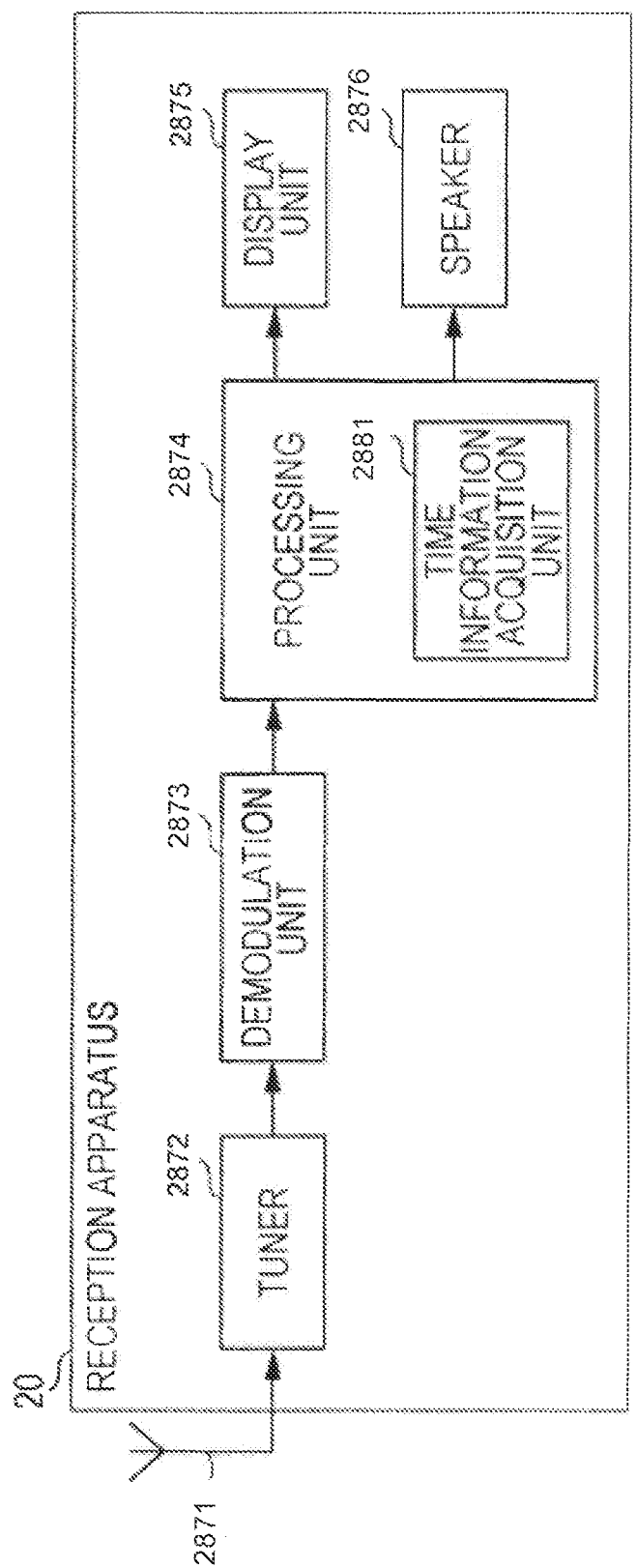
FIG. 28 is a block diagram illustrating a structure example of a reception apparatus.

FIG. 28 is a block diagram illustrating a structure example of the reception apparatus 20 in FIG. 1.

In FIG. 28, the reception apparatus 20 is configured from an antenna 2871, a tuner 2872, a demodulation unit 2873, a processing unit 2874, a display unit 2875, and a speaker 2876.

The antenna 2871 receives a digital broadcasting signal from the transmission apparatus 10 and supplies the received digital broadcasting signal to the tuner 2872.

The tuner 2872 receives a physical layer frame transmitted on a predetermined frequency channel, by selecting the predetermined frequency channel component from the digital broadcasting signal received from the antenna 2871. The tuner 2872 supplies the received physical layer frame to the demodulation unit 2873.

The demodulation unit 2873 performs demodulation processing for the physical layer frame supplied from the tuner 2872.

That is, the demodulation unit 2873 demodulates the preamble (first preamble BS and second preamble Preamble) of the physical layer frame. The demodulation unit 2873 demodulates the payload of the physical layer frame by using a demodulation result of the preamble as necessary.

The demodulation unit 2873 demodulates (decodes) the FEC frame obtained by demodulating the payload of the physical layer frame.

The demodulation unit 2873 demodulates the Generic packet from the BB frame obtained as a result of demodulation of the FEC frame, and demodulates the IP packet from the demodulated Generic packet. The demodulation unit 2873 supplies the demodulated IP packet to the processing unit 2874.

The demodulation unit 2873 acquires the time information describer included in the preamble of the physical layer frame in the demodulation processing. The demodulation unit 2873 supplies the acquired information to the processing unit 2874.

The processing unit 2874 decodes an image or sound of program from the IP packet received from the demodulation unit 2873. The processing unit 2874 supplies the image to the display unit 2875 and supplies the sound to the speaker 2876.

The processing unit 2874 includes a time information acquisition unit 2881. The time information acquisition unit 2881 acquires time information as necessary from the time information describer received from the demodulation unit 2873. The processing unit 2874 performs necessary processing by using the time information acquired by the time information acquisition unit 2881.

That is, for example, the processing unit 2874 (or demodulation unit 2873) performs, for example, clock data recovery or synchronization processing of performing synchronization with the transmission apparatus 10 by using the time information. The processing unit 2874 performs, for example, timing control processing of controlling a timing for presentation of an image, sound, or the like by using the time information. In addition, the time information may be applied to synchronization such as SFN synchronization of DVB-T.2, for example.

The display unit 2875 displays the image from the processing unit 2874. The speaker 2876 outputs the sound from the processing unit 2874.

In the reception apparatus 20 in FIG. 28, a configuration in which the display unit 2875 and the speaker 2876 are built-in is described. However, the display unit 2875 and the speaker 2876 may be provided externally.

Figure 29:
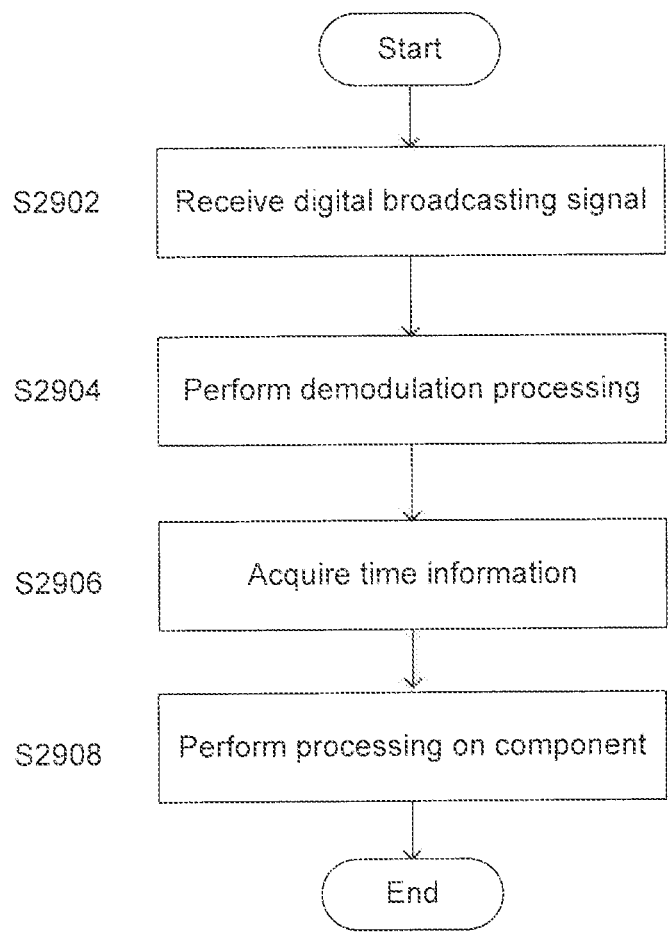
FIG. 29 is a flowchart illustrating reception processing which is performed by the reception apparatus.

FIG. 29 is a flowchart illustrating reception processing performed by the reception apparatus 20 in FIG. 28.

In step S2902, the tuner 2872 receives a physical layer frame from a digital broadcasting signal received from the antenna 2871 and supplies the received physical layer frame to the demodulation unit 2873. The process proceeds to step S2904.

In step S2904, the demodulation unit 2873 performs demodulation processing for the physical layer frame supplied from the tuner 2872, and supplies the IP packet or the time information describer which are obtained as a result of the demodulation processing, to the processing unit 2874. Then, the process proceeds to step S2906.

In step S2906, the time information acquisition unit 2881 of the processing unit 2874 acquires the time information from the time information describer received from the demodulation unit 2873. Then, the process proceeds to step S2908. Here, in the processing unit 2874, synchronization processing of performing synchronization with the transmission apparatus 10, and the like is performed by using the time information which is acquired by the time information acquisition unit 2881.

In step S2908, the processing unit 2874 performs processing on a component included in IP packets received from the demodulation unit 2873 in a state where synchronization with the transmission apparatus 10 is performed. That is, the processing unit 2874 decodes an image or sound of a program from the IP packets received from the demodulation unit 2873. The processing unit 2874 supplies the image to the display unit 2875 and performs display, and supplies the sound to the speaker 2876 and outputs the supplied sound.

As described above, in the transmission system in FIG. 1, the transmission apparatus 10 performs transmission in a state where (the time information describer including) the time information is included in the preamble of the physical layer frame. Thus, it is possible to efficiently transmit the time information.

In the transmission system in FIG. 1, the reception apparatus 20 performs processing by using the time information included (in the time information describer included) in the preamble of the physical layer frame. Thus, it is possible to rapidly perform processing.

FIG. 30 is a diagram illustrating information (below simply referred to as a PTP) of a point of time defined by the PTP, which can be used as the time information.

The PTP is defined by IEEE 1588 and is formed with 80 bits.

The 80-bit PTP is formed from a 48-bit seconds field representing a point of time in a second unit, and a 32-bit nanoseconds field representing a point of time in a nanosecond unit.

"1" of the seconds field represents 1 second and "1" of the nanoseconds field represents 1 nanosecond.

Accordingly, for example, in the PTP representing+ 2.000000001 seconds, the seconds field becomes 0x000000000002, and the nanoseconds field becomes 0x00000001. "0x" represents a value subsequent to "0x" is the hexadecimal number.

Here, since 109 nanoseconds are 1 second, the nanoseconds field has a value of 0 and less than 109.

That is, the maximum value in the nanoseconds field is 109-1. Since 109-1 is expressed by 30 bits, 2 higher bits of the 32-bit nanoseconds field have normally a value of 0.

In IEEE 1588, it is defined that an epoch which is a starting point of points of time represented by the PTP is 0 o'clock Jan. 1, 1970 in the International Atomic Time (TAI). That is, the PTP in IEEE 1588 represent a point of time by using 0 o'clock Jan. 1, 1970 in TAI, as the epoch.

As illustrated in FIG. 9, when the PTP is employed as the time information included in the physical layer frame, it is possible to transmit accurate time information and to cause the reception apparatus 10 to reproduce an accurate point of time. It is possible to prevent occurrence of a problem due to leap seconds.

According to the PTP, it is possible to express a very accurate point of time. However, when broadcasting is performed in the transmission system in FIG. 1, transmission of the time information more accurate than necessary for the broadcasting causes burden to be loaded on transmission band and thus becomes inefficient.

The 80-bit PTP is time information having sufficiently excessive accuracy by provision of a service through broadcasting. Thus, even though an information quantity of the PTP is decreased to a certain extent, provision of the service through broadcasting may be sufficiently held.

In the transmission system in FIG. 1, the information quantity of the PTP as the time information may be decreased and then transmitted.

As a method of decreasing the information quantity of the PTP, for example, a method of decreasing a transmission frequency of the PTP, and a method of compressing the PTP are included.

Here, as illustrated in FIGS. 10-15, the time information may be included in the payload, not in the preamble of the physical layer frame. However, in the following descriptions, descriptions will be made by using a case in which the time information is included in the preamble of the physical layer frame, as an example.

Figure 31:
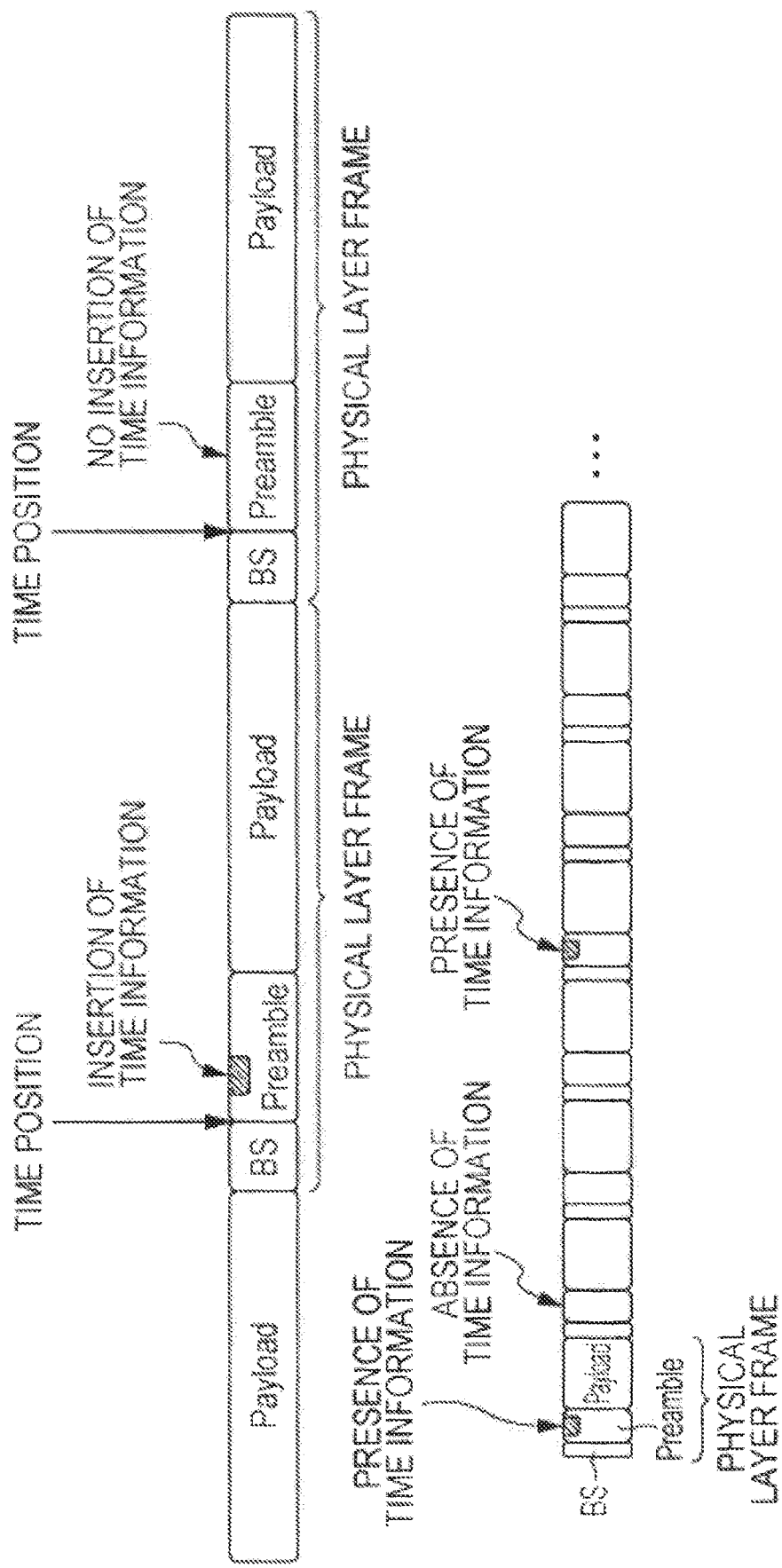
FIG. 31 is a diagram illustrating an example of a method of decreasing transmission frequency of the PTP.

FIG. 31 is a diagram illustrating an example of a method of decreasing the transmission frequency of the PTP.

The PTP as the time information may be included in all physical layer frames. However, synchronization with the transmission apparatus 10 is performed with necessary accuracy in the reception apparatus 20. Thus, there is a case where including of the PTP in all of (the second preambles Preamble of) the physical layer frame is unnecessary.

The PTP may be included only in some physical layer frames, not in all of the physical layer frames. Thus, it is possible to decrease the transmission frequency of the PTP.

In FIG. 31, the PTP as the time information is inserted only into (the second preamble Preamble of) the leading physical layer frame of the 4 physical layer frames for each 4 physical layer frames, and is transmitted.

In this case, the information quantity of the PTP which is to be transmitted to the reception apparatus 20 from the transmission apparatus 10 is decreased up to about ¼, and thus it is possible to efficiently transmit the PTP.

Figure 32:
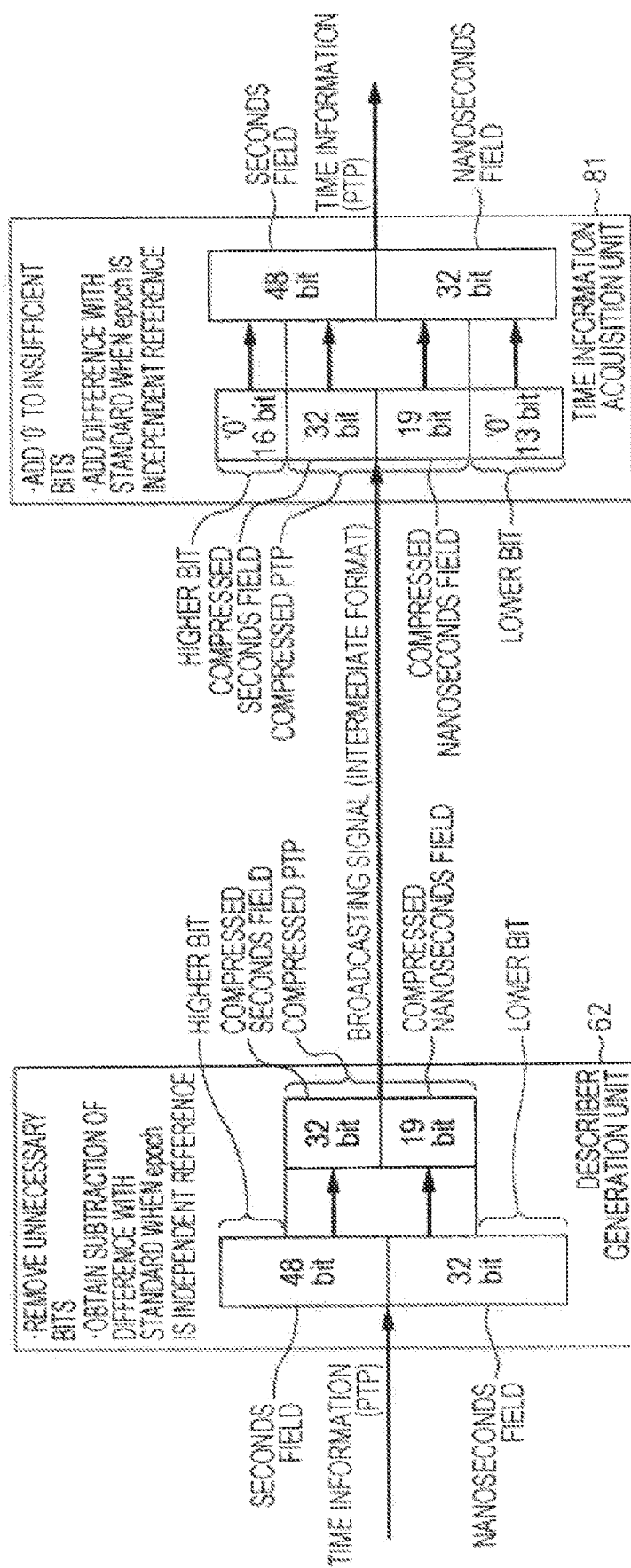
FIG. 32 is a diagram illustrating an example of a method of compressing the PTP.

FIG. 32 is a diagram illustrating an example of a method of compressing the PTP.

According to the 48-bit seconds field of the PTP, a point of time in a wide range of about 8,920 thousand years may be expressed. However, expression of a point of time in such a wide range is not necessary for broadcasting.

Here, for example, in America, analog broadcasting is changed to the first generation digital broadcasting method (ATSC) in about 1980's. The first generation digital broadcasting method (ATSC) is predicted to be changed to the second digital broadcasting method (ATSC3.0) in a year after about 30 years from a start of the broadcasting.

Considering such the current circumstances, when it is assumed that the broadcasting using the transmission system in FIG. 1 is used for 90 years from 2016, the PTP is sufficient for the time information included in the physical layer frame as long as points of time until about 2106 may be counted.

An epoch (below referred to as a reference epoch) defined by IEEE 1588 as the epoch of the PTP is in (0 o'clock Jan. 1, 1970). Thus, the PTP is sufficient in counting points of time up to in 2106, as long as points of time for 136 years (2106-1970) may be counted.

Since the number of seconds for 136 years may be counted with 32 bits, when points of time up to 2106 are counted as the PTP, the seconds field is sufficient with 32 bits.

When an epoch (also below referred to as independent epoch) which is independently determined, not the reference epoch is employed as the epoch of the PTP, the small number of bits may be employed for the seconds field.

That is, for example, when seconds are counted with 31 bits, it is possible to count the number of seconds for about 68 years. If, for example, 2016 is used as the independent epoch, and if 31 bits are employed for the seconds field, it is possible to count points of time up to 2084 (2016+68).

Accordingly, when it is assumed that the broadcasting performed by the transmission system in FIG. 1 is used up to about 2080 from 2016, it is possible to employ 31 bits for the seconds field by using (January 1) 2016 as the independent epoch.

Here, if the above descriptions are summarized, summary is as follows.

That is, when 32 bits are employed for the seconds field, the number of seconds for about 136 years may be counted. According to such the seconds field, when the reference epoch is employed, points of time up to 2106 (=1970+136) may be counted. When 2016 is employed as the independent epoch, points of time up to 2152 (=2016+136) may be counted.

When 31 bits are employed for the seconds field, the number of seconds for about 68 years may be counted. According to such the seconds field, when the reference epoch is employed, points of time up to 2038 (=1970+68) may be counted. When 2016 is employed as the independent epoch, points of time up to 2084 (=2016+68) may be counted.

Hitherto, a period of time for which the broadcasting is performed by the transmission system in FIG. 1 is determined based on an estimated period of time. However, it is expected that the seconds field having, for example, about 31 bits or 32 bits is sufficient.

Meanwhile, since the nanoseconds field of the PTP represents a point of time in a unit nanosecond, a 1 GHz clock (clock having a frequency of 1 GHz) may be counted at the maximum. However, in the broadcasting, (counting of) such a high speed clock is not necessary.

Here, according to a 32-bit nanoseconds field, it is possible to count the 1 GHz clock. That is, according to the 32-bit nanoseconds field, synchronization with the 1 GHz clock is performed and counting of a value of 0x0 to 0x3b9ac9ff (=109-1) is repeated while a value is increased by 20 corresponding to 1 ns(=1/(1 GHz)).

For example, according to a 27-bit nanoseconds field obtained by deleting 5 lower bits of the 32-bit nanoseconds field, it is possible to count a clock of 32.25 MHz=1 GHz/25. That is, according to the 27-bit nanoseconds field, in 32-bit conversion, synchronization with the 32.25 MHz clock is performed and counting of a value of 0x0 to 0x3b9ac9e0 (=109-25) is repeated while a value is increased by 25 corresponding to 25 ns(=1/(32.25 MHz))

For example, according to a 19-bit nanoseconds field obtained by deleting 13 lower bits of the 32-bit nanoseconds field, it is possible to count a clock of 122.0 kHz=1 GHz/213. That is, according to the 19-bit nanoseconds field, in 32-bit conversion, synchronization with the 122.0 kHz clock is performed and counting of a value of 0x0 to 0x3b9aa000 (=109-213) is repeated while a value is increased by 213 corresponding to 213 ns(=1/(122.0 kHz)).

In the broadcasting, generally, a clock of about 90 kHz or about 27 MHz is employed.

According to the 27-bit nanoseconds field which allows the clock of 32.25 MHz to be counted, it is possible to ensure accuracy of a 27 MHz clock. According to the 19-bit nanoseconds field which allows the clock of 122.0 kHz to be counted, it is possible to ensure accuracy of a 90 kHz clock.

Accordingly, in the broadcasting in which a clock of about 90 kHz or about 27 MHz is employed, even though 5 or 13 lower bits of the nanoseconds field are deleted and thus the 27-bit or 19-bit nanoseconds field is obtained, it is possible to ensure sufficient accuracy.

As illustrated in FIG. 30, since 2 higher bits of the nanoseconds field are normally 0, regarding the 27-bit or 19-bit nanoseconds field obtained by deleting 5 or 13 lower bits, a 25-bit or 17-bit nanoseconds field may be obtained by deleting 2 higher bits.

FIG. 32 illustrates an example of compression of the PTP when the seconds field is compressed to have 32 bits and the nanoseconds field is compressed to have 19 bits.

In the transmission apparatus 10 (FIG. 26), a 80-bit PTP configured from a 48-bit seconds field and a 32-bit nanoseconds field is supplied to the describer generation unit 2662 from the time information acquisition unit 2661.

The describer generation unit 2662 compresses the 48-bit seconds field to be a 32-bit seconds field (below referred to as a compression seconds field) by deleting, for example, 16 higher bits of the 48-bit seconds field.

The describer generation unit 2662 compresses the 32-bit nanoseconds field to be a 19-bit nanoseconds field (below referred to as a compression nanoseconds field) by deleting, for example, 13 lower bits of the 32-bit nanoseconds field.

The describer generation unit 2662 causes a 51-bit PTP (below referred to as a compression PTP) on which compression is performed so as to be the 32-bit compression seconds field and the 19-bit compression nanoseconds field, to be included in the time information describer and supplies a result of including to the preamble generation unit 2663 (FIG. 26).

As described above, in a method of compressing the PTP, some bits of each of the seconds field and the nanoseconds field in the PTP are deleted, and thus the PTP is compressed so as to be a compression PTP (compression time information) of an intermediate format so to speak, and is transmitted.

In the reception apparatus 20 (FIG. 28), the time information acquisition unit 2881 acquires the compression PTP included in the time information describer and recovers the acquired compression PTP to a PTP having a format defined by IEEE 1588.

That is, the time information acquisition unit 2881 adds 0 of 16 bits as higher bits of the 32-bit compression seconds field in the compression PTP, and thus recovers the 32-bit compression seconds field to a 48-bit seconds field.

The time information acquisition unit 2881 adds 0 of 13 bits as lower bits of the 19-bit compression nanoseconds field in the compression PTP, and thus recovers the 19-bit compression nanoseconds field to a 32-bit nanoseconds field.

The time information acquisition unit 2881 performs recovery to a PTP of a format defined by IEEE 1588, which is configured by the 48-bit seconds field and the 32-bit nanoseconds field.

In the describer generation unit 2662, the 32-bit nanoseconds field may be compressed to be a 17-bit compression nanoseconds field by deleting 13 lower bits of the 32-bit nanoseconds field, and deleting 2 higher bits which are normally 0, as described above.

In this case, in the time information acquisition unit 2881, 0 of 13 bits is added as lower bits of the 17-bit compression nanoseconds field and 0 of 2 bit is added as higher bits thereof. Thus, the 17-bit compression nanoseconds field is recovered to be a 32-bit nanoseconds field.

When the independent epoch, not the reference epoch is employed as the epoch of the PTP, the describer generation unit 2662 subtracts a period of time (below referred to as a difference time) corresponding to a difference (independent epoch-reference epoch) between the reference epoch and the independent epoch, from the PTP and then compresses the PTP after subtraction so as to be a compression PTP.

In this case, the time information acquisition unit 2881 recovers the compression seconds field and the compression nanoseconds field to be the seconds field and the nanoseconds field, and then adds the difference time to the seconds field and the nanoseconds field after recovery. Thus, a PTP (PTP of the reference epoch) having a format defined by IEEE 1588 is obtained by recovery.

FIG. 33 is a diagram illustrating an example of a compression mode in which the PTP is compressed.

In FIG. 33, the compression mode is represented by 4 bits and 16 types of compression mode, that is, Modes 0 to 15 may be defined.

In FIG. 33, Modes 3 and 7 to 15 are not defined (Reserved) and thus, substantially, 6 types of compression mode are defined.

In Mode 0, the PTP is not compressed and a PTP configured by the 48-bit seconds field and the 32-bit nanoseconds field is used. In Mode 0, the reference epoch is used as the epoch of the PTP.

In Mode 1, 16 higher bits of the 48-bit seconds field are deleted and thus compression to be a 32-bit seconds field is performed. 13 lower bits of the 32-bit nanoseconds field are deleted and thus compression to be a 19-bit nanoseconds field is performed. In Mode 1, the reference epoch is used as the epoch of the PTP.

In Mode 2, 16 higher bits of the 48-bit seconds field are deleted and thus compression to be a 32-bit seconds field is performed. 5 lower bits of the 32-bit nanoseconds field are deleted and thus compression to be a 27-bit nanoseconds field is performed. In Mode 2, the reference epoch is used as the epoch of the PTP.

In Mode 4, the PTP is not compressed and a PTP configured by the 48-bit seconds field and the 32-bit nanoseconds field is used. In Mode 4, the independent epoch is used as the epoch of the PTP.

In Mode 5, 17 higher bits of the 48-bit seconds field are deleted and thus compression to be a 31-bit seconds field is performed. 13 lower bits of the 32-bit nanoseconds field are deleted and thus compression to be a 19-bit nanoseconds field is performed. In Mode 5, the independent epoch is used as the epoch of the PTP.

In Mode 6, 17 higher bits of the 48-bit seconds field are deleted and thus compression to be a 31-bit seconds field is performed. 5 lower bits of the 32-bit nanoseconds field are deleted and thus compression to be a 27-bit nanoseconds field is performed. In Mode 6, the independent epoch is used as the epoch of the PTP.

The compression mode is determined, for example, on the transmission apparatus 10 side by estimating the number of bits necessary for the broadcasting regarding the seconds field and the nanoseconds field.

As illustrated in FIG. 32, compression may be performed by deleting 2 higher bits of the nanoseconds field in addition to lower bits thereof.

The compression mode in which the lower bits and the 2 higher bits of the nanoseconds field are deleted may be assigned to any one of not-defined modes in FIG. 33.

FIG. 34 is a diagram illustrating a first example of syntax of the time information describer.

In FIG. 34, a time_info_flag is a time information flag representing the presence or absence of the PTP (compression PTP) as the time information. A value of 0 represents the presence of the PTP and a value of 1 represents the absence of the PTP.

In this embodiment, a 1-bit flag is employed as the time_info_flag. However, 2 bits or more may be allocated to the time_info_flag When the time_info_flag is 0, the PTP is not included in the time information describer. When the time_info_flag is 1, the PTP is included in the time information describer.

For example, as illustrated in FIG. 31, when the PTP as the time information is inserted only into the leading physical layer frame of the 4 physical layer frames for each 4 physical layer frames, the time_info_flag of the time information describer included in the leading physical layer frame is 1 and the time_info_flag of the time information describer included in other 3 physical layer frames are 0.

In FIG. 34, a PTP_secondsField represents the seconds field of the PTP and a PTP_nanosecondsField represents the nanoseconds field of the PTP.

In FIG. 34, the compression PTP in the compression mode (FIG. 33) being Mode 1 is employed. For this reason, the PTP_seconsField has 32 bits and the PTP_nanosecondsField has 19 bits.

The syntax in FIG. 34 is used in a case where the compression mode is fixed to be a predetermined mode such as Mode 1.

The compression mode may be fixed to modes other than Mode 1. A mode to which the compression mode is fixed may be defined by, for example, broadcasting standards.

FIG. 35 is a diagram illustrating a second example of the syntax of the time information describer.

In FIG. 35, the time_info_flag is a time information flag illustrated in FIG. 34.

In FIG. 35, when the time_info_flag is 0, the compression mode and the PTP are not included in the time information describer. When the time_info_flag is 1, the compression mode and the PTP are included in the time information describer.

In FIG. 35, a "mode" represents the compression mode.

When the "mode" is 0 or 4, as illustrated in FIG. 33, a PTP configured by the 48-bit seconds field (PTP_secondsField) and the 32-bit nanoseconds field (PTP_nanosecondsField) is included in the time information describer.

When the "mode" is 1, as illustrated in FIG. 33, a compression PTP configured by the 32-bit compression seconds field (PTP_secondsField) and the 19-bit compression nanoseconds field (PTP_nanosecondsField) is included in the time information describer.

When the "mode" is 2, as illustrated in FIG. 33, a compression PTP configured by the 32-bit compression seconds field (PTP_secondsField) and the 27-bit compression nanoseconds field (PTP_nanosecondsField) is included in the time information describer.

When the "mode" is 5, as illustrated in FIG. 33, a compression PTP configured by the 31-bit compression seconds field (PTP_secondsField) and the 19-bit compression nanoseconds field (PTP_nanosecondsField) is included in the time information describer.

When the "mode" is 6, as illustrated in FIG. 33, a compression PTP configured by the 31-bit compression seconds field (PTP_secondsField) and the 27-bit compression nanoseconds field (PTP_nanosecondsField) is included in the time information describer.

The syntax in FIG. 35 is used in a case where the compression mode may be selected as necessary.

The time information describer in FIGS. 34 and 35 may be formed without the time_info_flag which is the time information flag.

When the time_info_flag is not included in the time information describer, the (compression) PTP as the time information is transmitted in all physical layer frames.

Here, as described above, a method of decreasing the transmission frequency of the PTP or a method of compressing the PTP may be applied to arbitrary information of a point of time such as information of a point of time defined by the NTP, information of a point of time defined by 3GPP, information of a point of time included in GPS information, and other information of a point of time, which has an independently determined format, in addition to the PTP, as the time information.

In the above descriptions, the IP packet is transmitted in the transmission system in FIG. 1. However, for example, a TS packet and the like other than the IP packet, may be transmitted.

The transmission system in FIG. 1 may be applied in any data transmission such as ATSC 3.0, DVB, and ISDB, for example.

Figure 36:
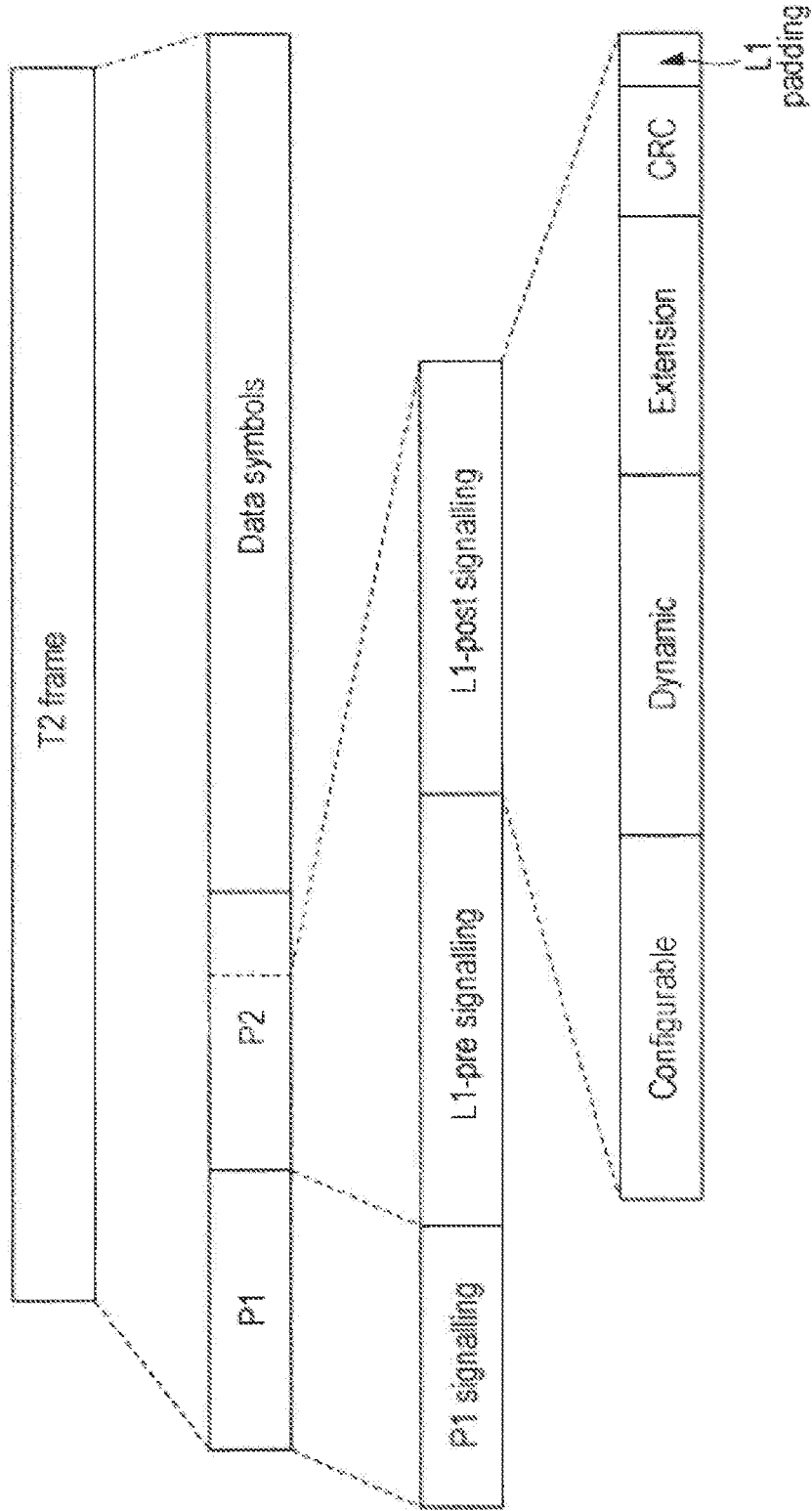
FIG. 36 is a diagram illustrating a structure of a T2 frame which is a physical layer frame of DVB-T.2.

FIG. 36 is a diagram illustrating a configuration of the T2 frame which is a physical layer frame of DVB-T.2

The T2 frame has a P1 field and a P2 field which are set as preambles, and a data symbol files (Data symbols) as payload.

The P1 field has a P1 signaling field, and the P2 field has an L1-pre signaling field and an L1-post signaling field.

The L1-post signaling field has files of Configurable, Dynamic, Extension, CRC, and L1 padding.

The time information may be included in (for example, the P2 field of) the preamble of the above-described T2 frame.

The order information may be included in the BB header of the BB frame which is placed as the data symbol field of the above-described T2 frame.

Figure 37:
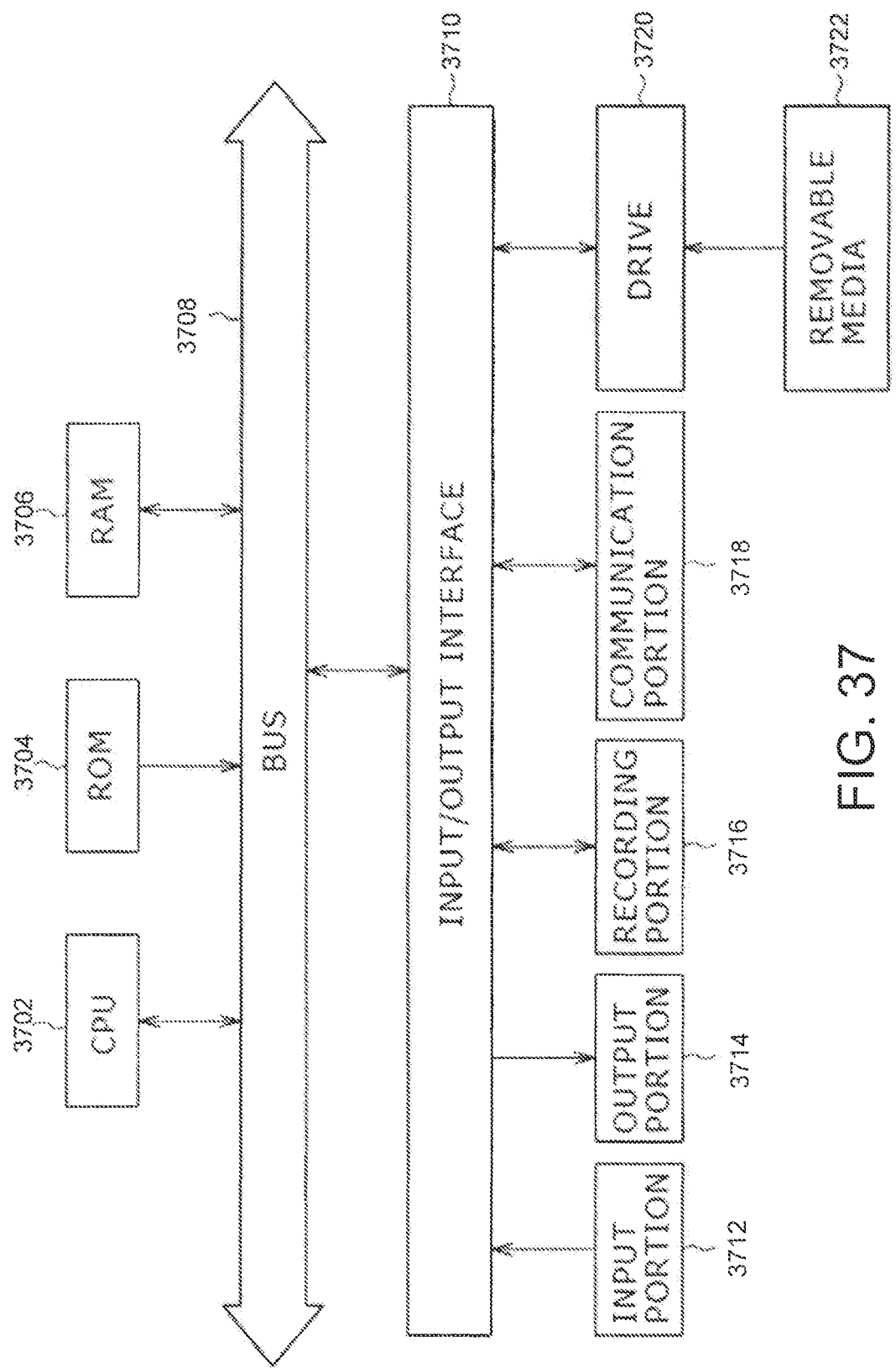
FIG. 37 is a block diagram showing an example of a hardware configuration of a computer.

FIG. 37 is a block diagram showing an example of a hardware configuration of a computer configured to function as, or control, any one or a combination of the content provider 10 (including the information providing apparatus or transmission apparatus), the reception apparatus 20, and the server 40. As illustrated in FIG. 37, the computer includes a central processing unit (CPU) 3702, read only memory (ROM) 3704, and a random access memory (RAM) 3706 interconnected to each other via one or more buses 3708. The one or more buses 3708 is further connected with an input-output interface 3710. The input-output interface 3710 is connected with an input portion 3712 formed by a keyboard, a mouse, a microphone, remote controller, etc. The input-output interface 3710 is also connected to a output portion 3714 formed by an audio interface, video interface, display, speaker, etc.; a recording portion 3716 formed by a hard disk, a non-volatile memory, etc.; a communication portion 3718 formed by a network interface, modem, USB interface, FireWire interface, etc.; and a drive 3720 for driving removable media 3722 such as a magnetic disk, an optical disk, a magneto-optical disk, a semiconductor memory, etc.

According to one embodiment, the CPU 3702 loads a program stored in the recording portion 3716 into the RAM 3706 via the input-output interface 3710 and the bus 3708, and then executes a program configured to provide the functionality of the one or combination of the content provider 10 (including the information providing apparatus or transmission apparatus), the reception apparatus 20, and the server 40.

The various processes discussed above need not be processed chronologically in the sequence depicted as flowcharts; the steps may also include those processed parallelly or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), etc.). All component elements may or may not be housed in a single enclosure. Therefore, a plurality of apparatuses each housed in a separate enclosure and connected via a network are considered a network, and a single apparatus formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof.

For example, this technology may be structured for cloud computing whereby a single function is shared and processed in collaboration among a plurality of apparatuses via a network.

Also, each of the steps explained in reference to the above-described flowcharts may be executed not only by a single apparatus but also by a plurality of apparatuses in a shared manner.

Furthermore, if one step includes a plurality of processes, these processes included in the step may be performed not only by a single apparatus but also by a plurality of apparatuses in a shared manner.

Numerous modifications and variations of the embodiments of the present disclosure are possible in light of the above teachings. It is therefore to be understood that within the scope of the appended claims, the embodiments may be practiced otherwise than as specifically described herein.

The above disclosure also encompasses the embodiments noted below.

(1) A method of a reception apparatus for receiving transmission frames, the method including receiving, by circuitry of the reception apparatus, the transmission frames transmitted on one millisecond boundaries, each of the transmission frames including a bootstrap, a preamble, and a payload; and determining, by the circuitry, an absolute point of time at a predetermined position in a stream of the transmission frames based on first time information included in a first one of the transmission frames.

(2) The method according to feature (1), in which the absolute point of time is when a portion of the stream at the predetermined position is transmitted.

(3) The method according to feature (1) or (2), in which the first time information is included in the preamble of the first one of the transmission frames.

(4) The method according to any of features (1) to (3), in which the absolute point of time indicates a time at which a first symbol of the bootstrap in the first one of the transmission frames was transmitted.

(5) The method according to feature (4), in which the first symbol is aligned with one of the one millisecond boundaries on which the first one of the transmission frames is transmitted.

(6) The method according to any of features (1) to (5), in which each of only a subset of the transmission frames includes time information that indicate absolute points of time at different predetermined positions in the stream of the transmission frames.

(7) The method according to any of features (1) to (6), in which the step of receiving the transmission frames includes receiving a digital television broadcast signal.

(8) The method according to any of features (1) to (7), in which sampling frequencies of the preamble and the payload of each of the transmission frames are the same.

(9) A non-transitory computer-readable medium storing instructions which when executed by a computer cause the computer to perform the method according to any one of features (1) to (8).

(10) A reception apparatus, including circuitry configured to receive transmission frames transmitted on one millisecond boundaries, each of the transmission frames including a bootstrap, a preamble, and a payload; and determine an absolute point of time at a predetermined position in a stream of the transmission frames based on first time information included in a first one of the transmission frames.

(11) The reception apparatus according to feature (10), in which the absolute point of time is when a portion of the stream at the predetermined position is transmitted.

(12) The reception apparatus according to feature (10) or (11), in which the first time information is included in the preamble of the first one of the transmission frames.

(13) The reception apparatus according to any of features (10) to (12), in which the absolute point of time indicates a time at which a first symbol of the bootstrap in the first one of the transmission frames was transmitted.

(14) The reception apparatus according to feature (13), in which the first symbol is aligned with one of the one millisecond boundaries on which the first one of the transmission frames is transmitted.

(15) The reception apparatus according to any of features (10) to (14), in which each of only a subset of the transmission frames includes time information that indicate absolute points of time at different predetermined positions in the stream of the transmission frames.

(16) The reception apparatus according to any of features (10) to (15), in which the circuitry is configured to receive a digital television broadcast signal that includes the stream of transmission frames.

(17) The reception apparatus according to any of features (10) to (16), in which sampling frequencies of the preamble and the payload of each of the transmission frames are the same.

(18) A method of an information providing apparatus for providing a stream of transmission frames, including generating, by circuitry of the information providing apparatus, first time information that indicates an absolute point of time at a predetermined position in the stream of the transmission frames; generating the transmission frames, the generated time information being included in a first one of the transmission frames; and transmitting, by the circuitry, the transmission frames on one millisecond boundaries, wherein each of the plurality of transmission frames includes a bootstrap, a preamble, and a payload.

(19) The method according to feature (18), in which the absolute point of time is when a portion of the stream at the predetermined position is transmitted.

(20) The method according to feature (18) or (19), in which the first time information is included in the preamble of the first one of the transmission frames.

(21) The method according to any of features (18) to (20), in which the absolute point of time indicates a time at which a first symbol of the bootstrap in the first one of the transmission frames is transmitted.

(22) The method according to feature (21), in which the first symbol is aligned with one of the one millisecond boundaries on which the first one of the transmission frames is transmitted.

(23) The method according to any of features (18) to (22), further including generating time information for only a subset of the transmission frames that indicate absolute points of time at different predetermined positions in the stream of the transmission frames.

(24) A non-transitory computer-readable medium storing instructions which when executed by a computer cause the computer to perform the method according to any one of features (18) to (23).

(25) An information processing apparatus including circuitry configured to perform the method according to any one of features (18) to (23).

(26) A method of a reception apparatus for determining a time frequency of a plurality of transmission frames, the method including receiving by circuitry of the reception apparatus a first transmission frame, the first transmission frame including a bootstrap, a preamble, and a payload; and determining by the circuitry the time frequency based on a baseband sample rate coefficient N signaled in the bootstrap and a time length TL of the first transmission frame, in which the time frequency indicates a distance between the first transmission frame and a second transmission frame.

(27) The method according to feature (26), in which each of the first and second transmission frames includes a mark, any transmission frames transmitted between the first and second transmission frames do not include the mark, and the time frequency indicates the distance between the mark included in the first transmission frame and the mark included in the second transmission frame.

(28) The method according to feature (26) or (27), in which the step of determining the time frequency includes determining the time frequency using the following formula: $(384*[N+16])*TL$, and the time length TL is defined in milliseconds.

(29) The method according to any one of features (26) to (28), in which the time length TL is signaled in the preamble of the first transmission frame.

(30) The method according to any one of features (26) to (29), further including adjusting a clock used in a middle layer to process the plurality of transmission frames based on the determined time frequency.

(31) The method according to any one of features (26) to (30), further including determining the baseband sample rate coefficient N based on bootstrap symbol 2, which is included in the bootstrap of the first transmission frame.

(32) The method according to any one of features (26) to (31), in which the baseband sample rate coefficient N is in a range of 0 to 80, inclusive.

(33) The method according to any one of features (26) to (32), in which the preamble of the first transmission frame further includes time information.

(34) The method according to any one of features (26) to (33), in which the step of receiving the first transmission frame includes receiving a digital television broadcast signal.

(35) The method according to any one of features (26) to (34), in which sampling frequencies of the preamble and the payload of the first transmission frame are the same.

(36) A non-transitory computer-readable medium storing instructions which when executed by a computer cause the computer to perform the method according to any one of features (26) to (35).

(37) A reception apparatus, including circuitry configured to receive a first transmission frame, the first transmission frame including a bootstrap, a preamble, and a payload; and determine a time frequency based on a baseband sample rate coefficient N signaled in the bootstrap and a time length TL of the first transmission frame, in which the time frequency indicates a distance between the first transmission frame and a second transmission frame.

(38) The reception apparatus according to feature (37), in which each of the first and second transmission frames includes a mark, any transmission frames transmitted between the first and second transmission frames do not include the mark, and the time frequency indicates the distance between the mark included in the first transmission frame and the mark included in the second transmission frame.

(39) The reception apparatus according to feature (37) or (38), in which the circuitry is configured to determine the time frequency using the following formula: $(384*[N+16])*TL$, and the time length TL is defined in milliseconds.

(40) The reception apparatus according to any one of features (37) to (39), in which the time length TL is signaled in the preamble of the first transmission frame.

(41) The reception apparatus according to any one of features (37) to (40), in which the circuitry is further configured to adjust a clock used in a middle layer to process the plurality of transmission frames based on the determined time frequency.

(42) The reception apparatus according to any one of features (37) to (41), in which the circuitry is further configured to determine the baseband sample rate coefficient N based on bootstrap symbol 2, which is included in the bootstrap of the first transmission frame.

(43) The reception apparatus according to any one of features (37) to (42), in which the baseband sample rate coefficient N is in a range of 0 to 80, inclusive.

(44) The reception apparatus according to any one of features (37) to (43), in which the preamble of the first transmission frame further includes time information.

(45) The reception apparatus according to any one of features (37) to (44), in which the step of receiving the first transmission frame includes receiving a digital television broadcast signal.

(46) The reception apparatus according to any one of features (37) to (45), in which sampling frequencies of the preamble and the payload of the first transmission frame are the same.

(47) A method of an information providing apparatus for providing a plurality of transmission frames, including generating, by circuitry of the information providing apparatus, the plurality of transmission frames based on a frame time length TL, each of the plurality of transmission frames including a bootstrap, a preamble, and a payload; and transmitting, by the circuitry, the plurality of transmission frames according to a time frequency that is determined based on a baseband sample rate coefficient N signaled in the bootstrap and the at least one time length TL, in which the time frequency indicates a distance between a first transmission frame of the plurality of transmission frames and a second transmission frame of the plurality of transmission frames.

(48) The method according to feature (47), in which each of the first and second transmission frames includes a mark, any transmission frames transmitted between the first and second transmission frames do not include the mark, and the time frequency indicates the distance between the mark included in the first transmission frame and the mark included in the second transmission frame.

(49) The method according to feature (47) or (48), in which the time frequency is determined using the following formula: $(384*[N+16])*TL$, and the frame time length TL is defined in milliseconds.

(50) The method according to any one of features (47) to (49), in which the frame time length TL is signaled in the preamble of one of the plurality of transmission frames.

(51) The method according to any one of features (47) to (50), in which the baseband sample rate coefficient N is signaled in bootstrap symbol 2, which is included in the bootstrap of one of the plurality of transmission frames.

(52) The method according to any one of features (47) to (51), in which the baseband sample rate coefficient N is in a range of 0 to 80, inclusive.

(53) The method according to any one of features (47) to (52), in which the preamble of the first transmission frame further includes time information.

(54) The method according to any one of features (47) to (53), in which the step of transmitting the plurality of transmission frames includes transmitting the plurality of transmission frames in a digital television broadcast signal.

(55) The method according to any one of features (47) to (54), in which sampling frequencies of the preamble and the payload of the first transmission frame are the same.

(56) A non-transitory computer-readable medium storing instructions which when executed by a computer cause the computer to perform the method according to any one of features (47) to (55).

(57) An information processing apparatus including circuitry configured to perform the method according to any one of features (47) to (55).

The invention claimed is:

1. A method of a reception apparatus for receiving a digital television broadcast signal that includes transmission frames, the method comprising:
receiving, by a receiver of the reception apparatus, the transmission frames, wherein each of the transmission frames includes a bootstrap, a preamble, and a payload, time information, at which a portion of one of the transmission frames was transmitted, is included in the preamble of the one of the transmission frames,
the one of the transmission frames is included in a plurality of transmission frames, and
the one of the transmission frames is the only transmission frame of the plurality of transmission frames that includes the time information; and
acquiring, by a processor of the reception apparatus, the time information from the preamble of the one of the transmission frames.

2. The method according to claim 1, the method further comprising adjusting a clock based on the time information.

3. The method according to claim 1, the method further comprising presenting, by a display, content included in the digital television broadcast signal.

4. The method according to claim 3, wherein the content includes at least one of video data, audio data, closed caption data, electronic program guide data, and non-real time content.

5. The method according to claim 3, the method further comprising controlling a timing for presentation of the content based on the time information.

6. The method according to claim 1, wherein the time information is in accordance with a precision time protocol.

7. The method according to claim 1, wherein the portion is the bootstrap.

8. The method according to claim 1, wherein the time information indicates a time at which a first symbol of the portion of the one of the transmission frames was transmitted.

9. A non-transitory computer-readable medium storing instructions which when executed by a computer cause the computer to perform a method for receiving a digital television broadcast signal that includes transmission frames, the method comprising:
receiving the transmission frames, wherein
each of the transmission frames includes a bootstrap, a preamble, and a payload,
time information at which a portion of one of the transmission frames was transmitted is included in the preamble of the one of the transmission frames,
the one of the transmission frames is included in a plurality of transmission frames, and
the one of the transmission frames is the only transmission frame of the plurality of transmission frames that includes the time information; and
acquiring the time information from the preamble of the one of the transmission frames.

10. A reception apparatus, comprising:
a receiver configured to receive a digital television broadcast signal that includes transmission frames, wherein
each of the transmission frames includes a bootstrap, a preamble, and a payload,
time information at which a portion of one of the transmission frames was transmitted is included in the preamble of the one of the transmission frames,
the one of the transmission frames is included in a plurality of transmission frames, and
the one of the transmission frames is the only transmission frame of the plurality of transmission frames that includes the time information; and
a processor configured to acquire the time information from the preamble of the one of the transmission frames.

11. The reception apparatus according to claim 10, wherein the processor is further configured to adjust a clock based on the time information.

12. The reception apparatus according to claim 10, further comprising a display configured to present content included in the digital television broadcast signal.

13. The reception apparatus according to claim 12, wherein the content includes at least one of video data, audio data, closed caption data, electronic program guide data, and non-real time content.

14. The reception apparatus according to claim 12, wherein the processor is further configured to control a timing for presentation of the content based on the time information.

15. The reception apparatus according to claim 10, wherein the time information is in accordance with a precision time protocol.

16. The reception apparatus according to claim 10, wherein the portion is the bootstrap.

17. The reception apparatus according to claim 10, wherein the time information indicates a time at which a first symbol of the portion of the one of the transmission frames was transmitted.

18. A reception apparatus method for receiving transmission frames of a digital television signal, the method comprising:
receiving, by the reception apparatus, the transmission frames including a bootstrap, a preamble, and a payload, wherein
only a subset of the transmission frames includes time information, and
the time information for each of the subset of the transmission frames indicates a timing associated with a predetermined position of a respective transmission frame.

19. The method according to claim 18, wherein the time information is included in a first one of the transmission frames.

20. The method according to claim 18, further comprising determining an absolute point of time at a position in a stream of the transmission frames based on first time information included in a first one of the transmission frames.

21. The method according to claim 20, wherein the absolute point of time is a time when a portion of the stream at the position was transmitted.

* * * * *